US008118340B2

(12) United States Patent  (10) Patent No.: US 8,118,340 B2
Jantzen  (45) Date of Patent: Feb. 21, 2012

(54) REMOTELY-OPERATED ROPE-THREADING TOOL

(76) Inventor: Leon Keith Jantzen, Calgary (CA)

( * ) Notice: Subject to any disclaimer, the term of this patent is extended or adjusted under 35 U.S.C. 154(b) by 0 days.

(21) Appl. No.: 12/989,954

(22) PCT Filed: Apr. 27, 2009

(86) PCT No.: PCT/CA2009/000556
§ 371 (c)(1),
(2), (4) Date: Oct. 27, 2010

(87) PCT Pub. No.: WO2009/132432
PCT Pub. Date: Nov. 5, 2009

(65) Prior Publication Data
US 2011/0042979 A1  Feb. 24, 2011

Related U.S. Application Data

(60) Provisional application No. 61/048,203, filed on Apr. 27, 2008, provisional application No. 61/145,575, filed on Jan. 18, 2009.

(51) Int. Cl.
*B66F 19/00* (2006.01)
(52) U.S. Cl. .................. 294/191; 294/210; 294/211
(58) Field of Classification Search ............. 294/19.1, 294/209, 210, 211, 191; 114/221 R; 119/807, 119/801, 806, 802, 803, 804, 805, 808
See application file for complete search history.

(56) References Cited

U.S. PATENT DOCUMENTS

| 1,054,044 | A | * | 2/1913  | Shindoll ............ 119/807 |
| 1,830,208 | A | * | 11/1931 | Norling ............ 289/18.1 |
| 2,591,638 | A | * | 4/1952  | Trafton ............ 294/110.1 |
| 2,730,985 | A |   | 1/1956  | Wingate |
| 2,813,736 | A |   | 11/1957 | Archer |
| 5,292,160 | A |   | 3/1994  | Deichman |
| 6,079,141 | A | * | 6/2000  | Washecka ............ 43/5 |
| 6,085,681 | A | * | 7/2000  | Morton ............ 114/221 R |

FOREIGN PATENT DOCUMENTS

GB  2344541  6/2000
WO  PCT/CA2009/000556  8/2009

* cited by examiner

*Primary Examiner* — Saul Rodriguez
*Assistant Examiner* — Gabriela Puig
(74) *Attorney, Agent, or Firm* — Christopher J. McGeehan; McGeehan Technology Law, Ltd.

(57) ABSTRACT

A tool for threading a rope through a distant eye or around an object out of reach, such as for elevating tarps into trees, or placing fall protection lines, or securing a distant object. The tool has two curved arms that extend out from the body in unison and converge at a point where the end of the rope is passed from one arm to the other. The arms are then retracted back into the body, pulling the rope through the eye or around the object. The arms are extended by pulling one control line and retracted by pulling a second control line. The tool is typically mounted on the end of a pole, although other mountings are possible. The shape of the tool enables ropes to be threaded through a large number of eye configurations and around objects of varying sizes, even if there are obstructions adjacent the eye.

23 Claims, 23 Drawing Sheets

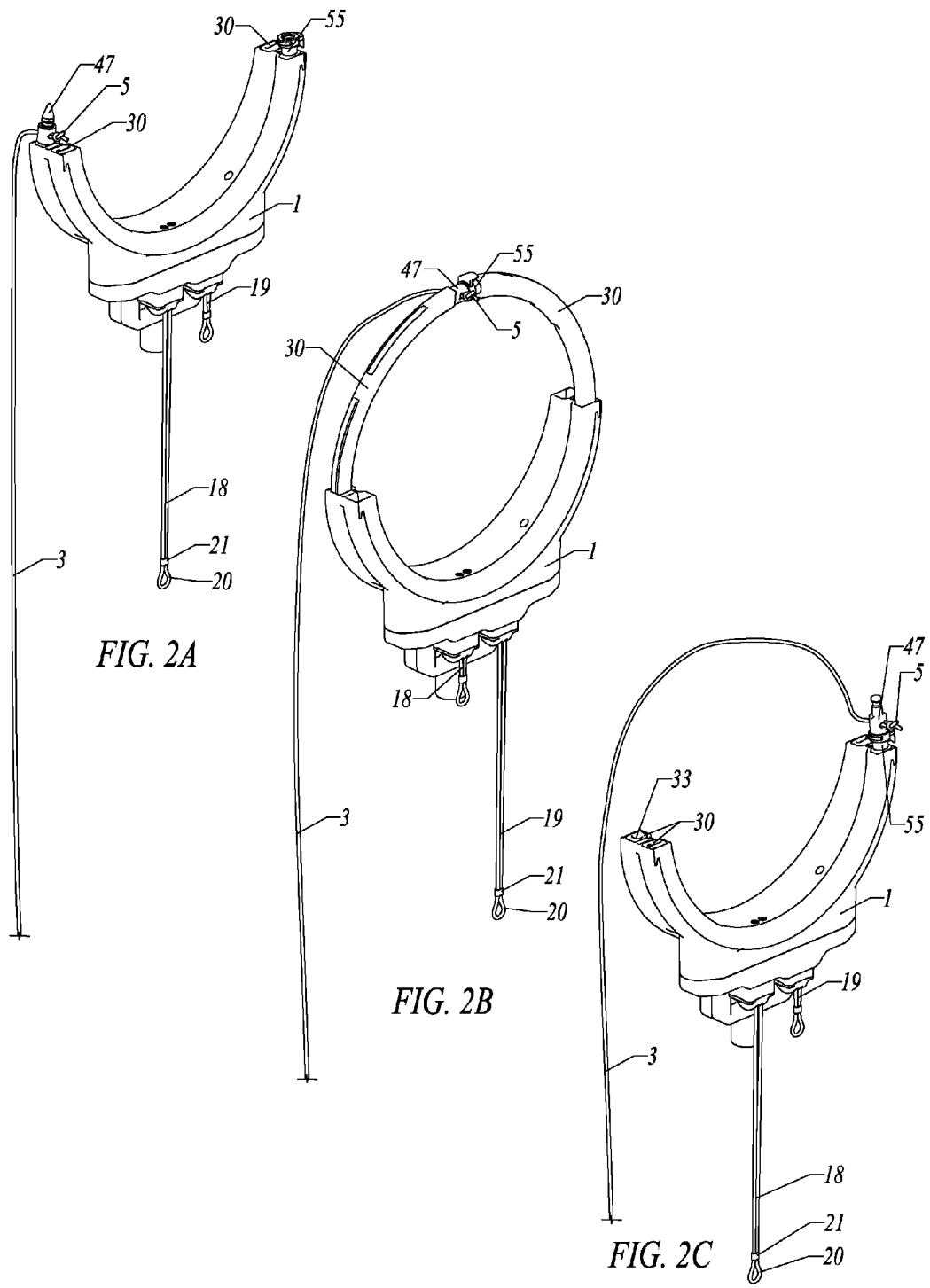

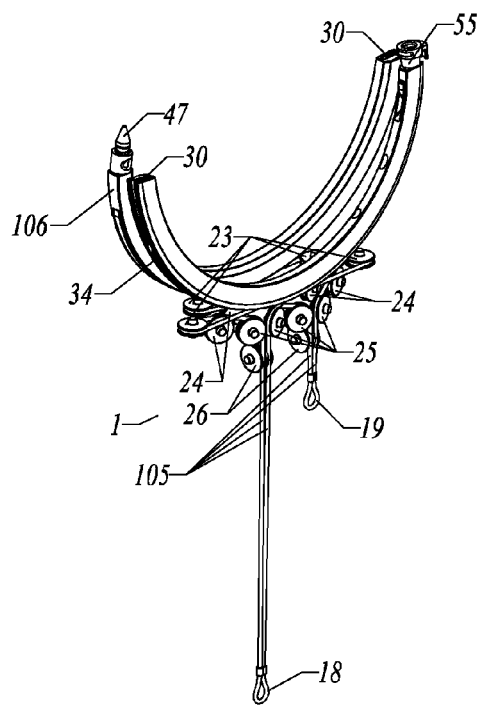
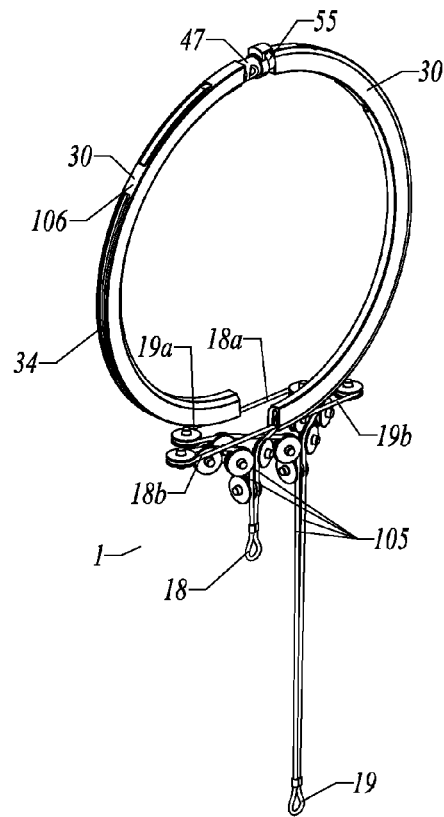
FIG. 3A
FIG. 3B
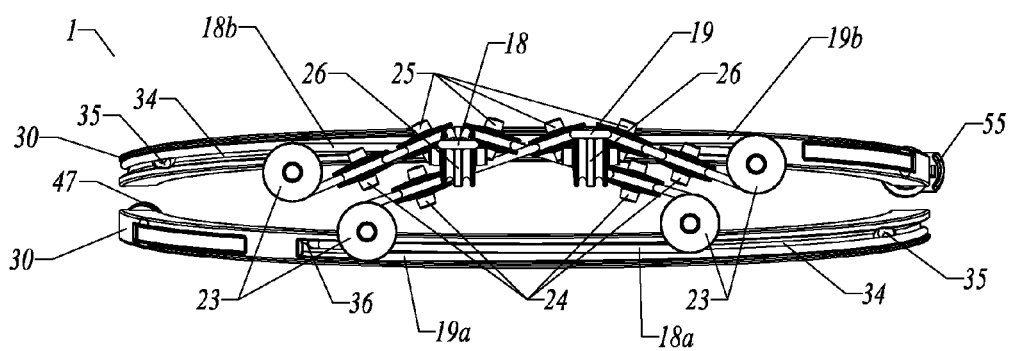
FIG. 4

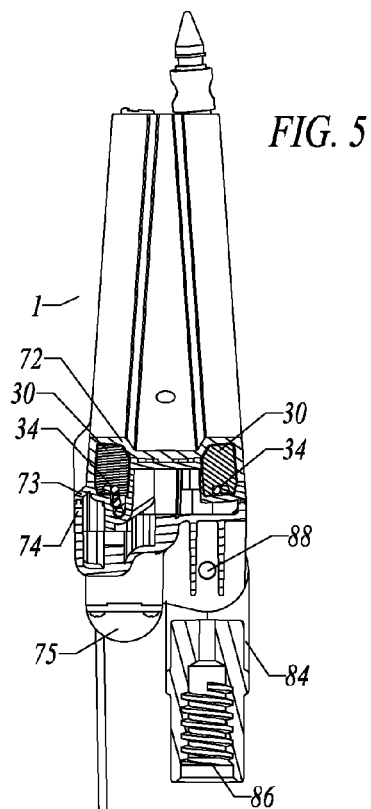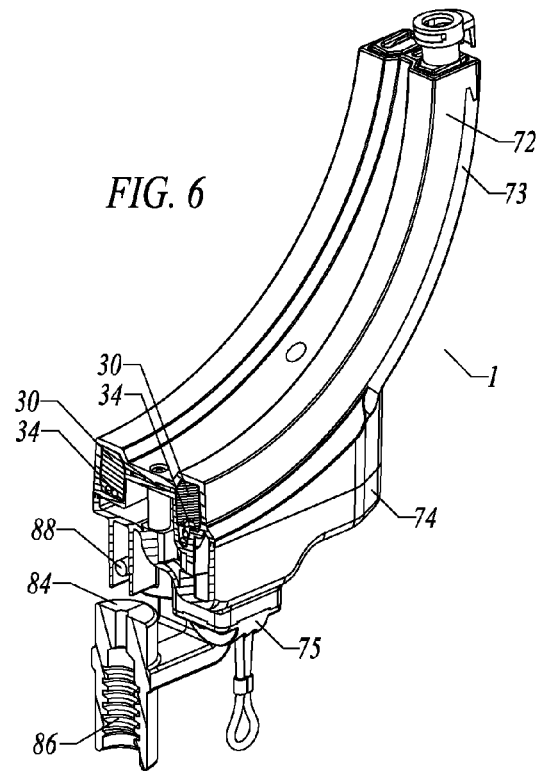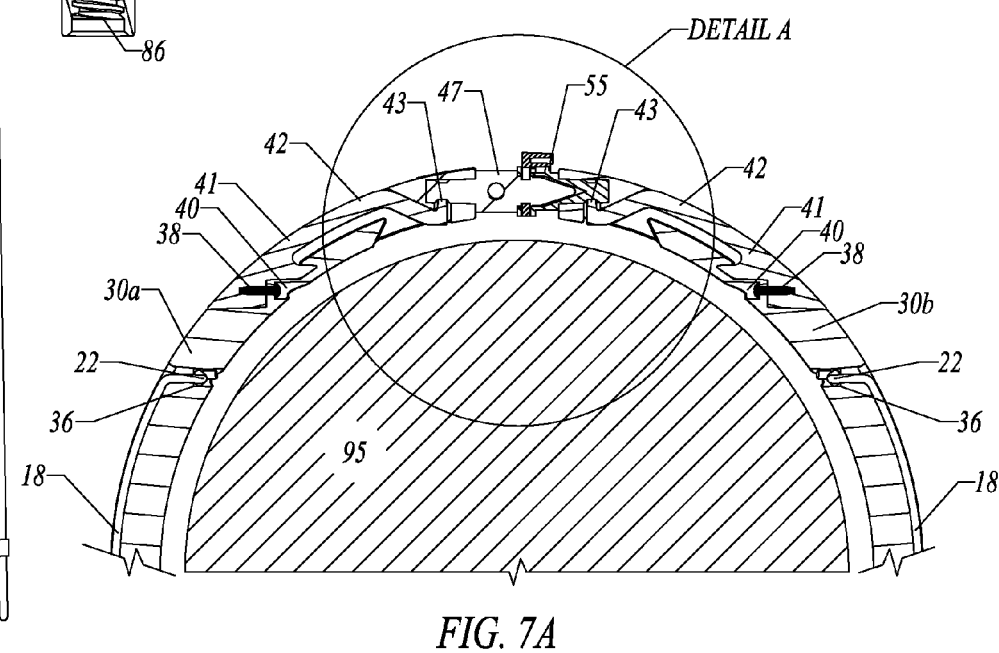
FIG. 5
FIG. 6
FIG. 7A

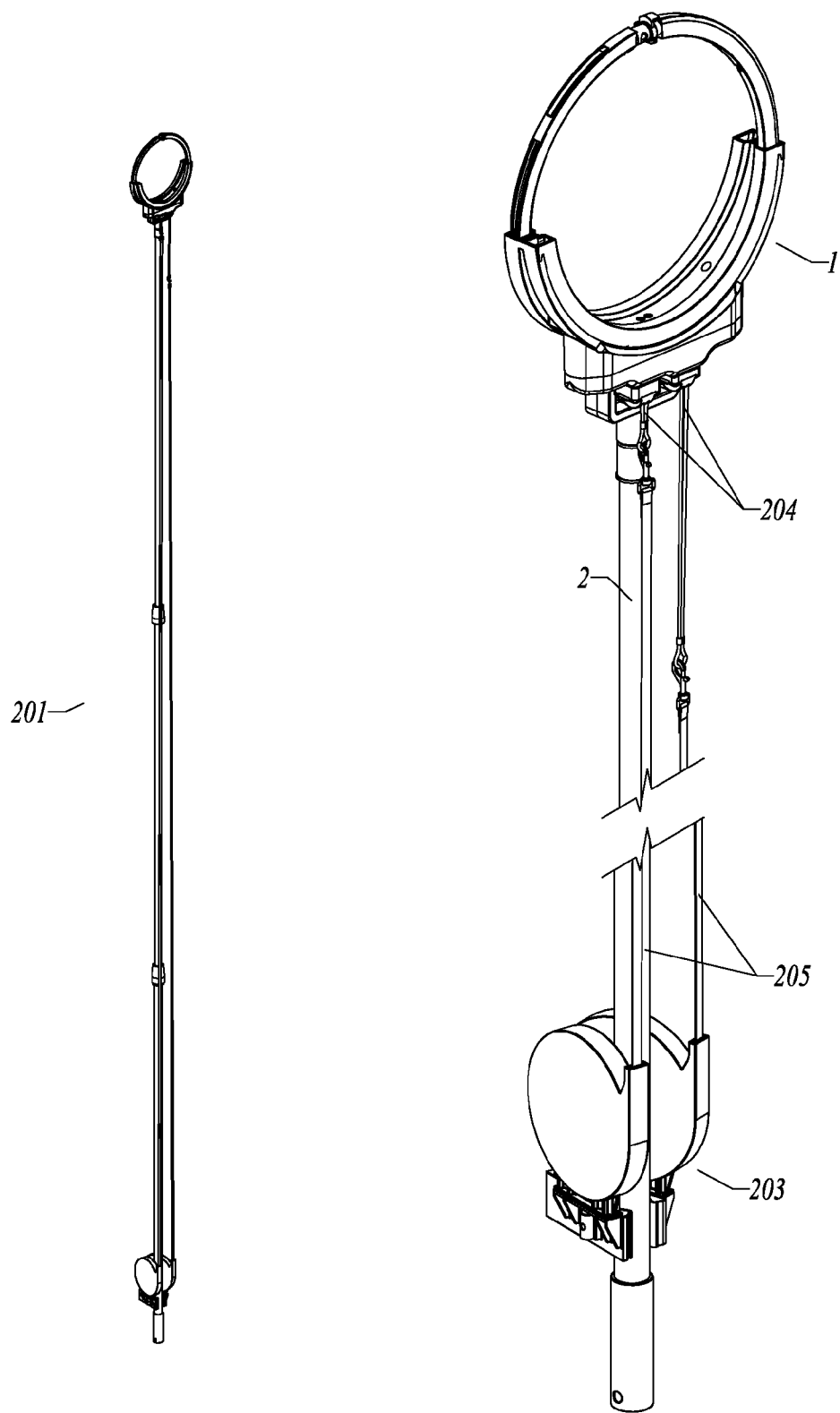
*FIG. 22A*  *FIG. 22B*

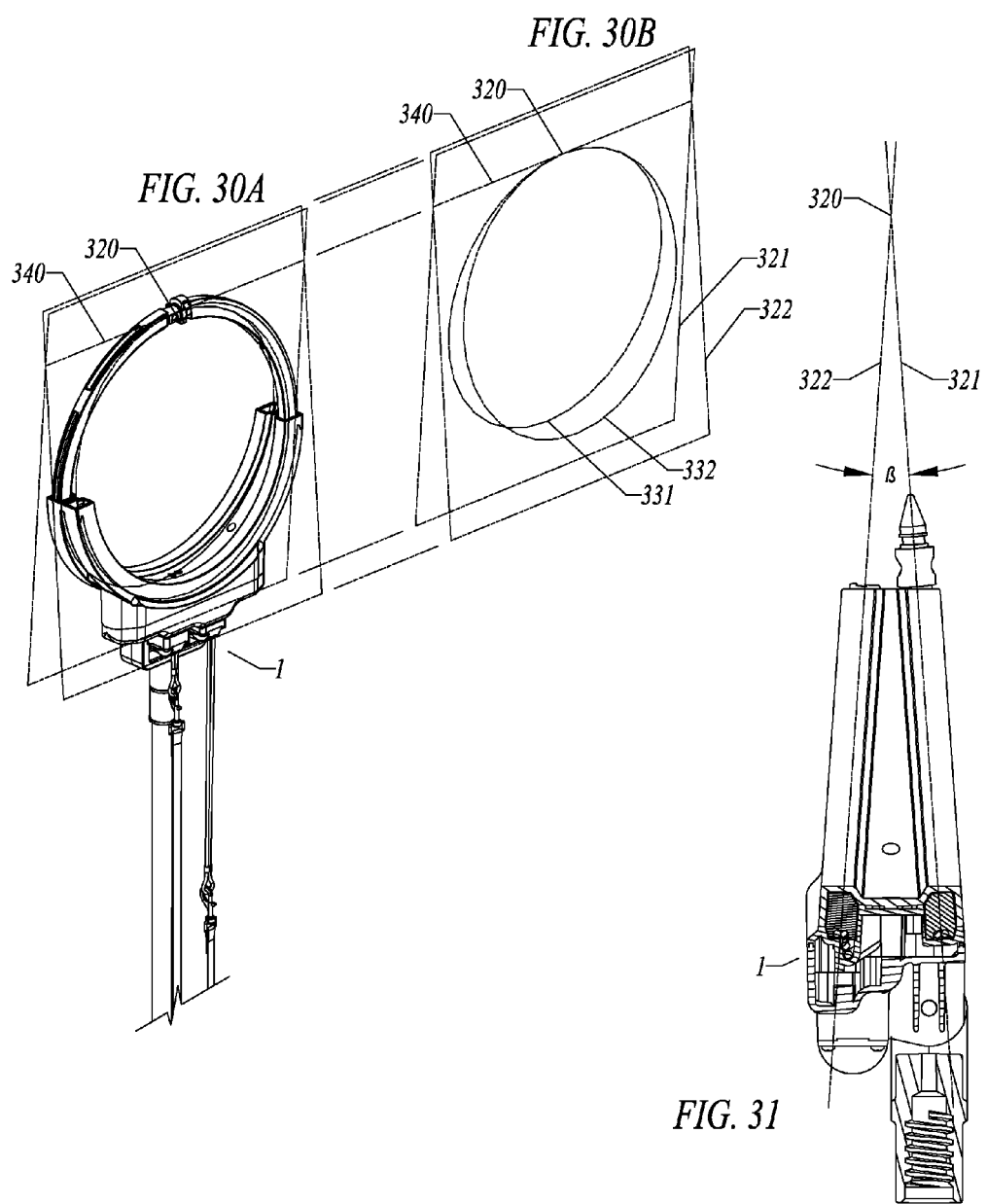

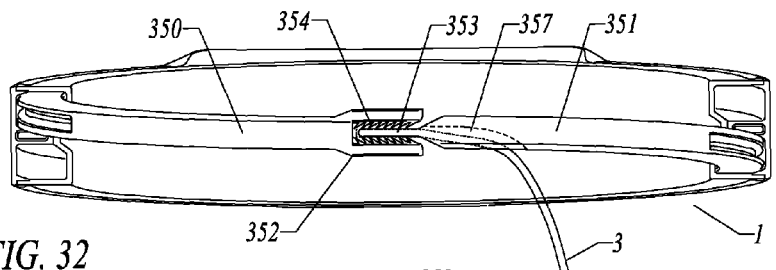
FIG. 32
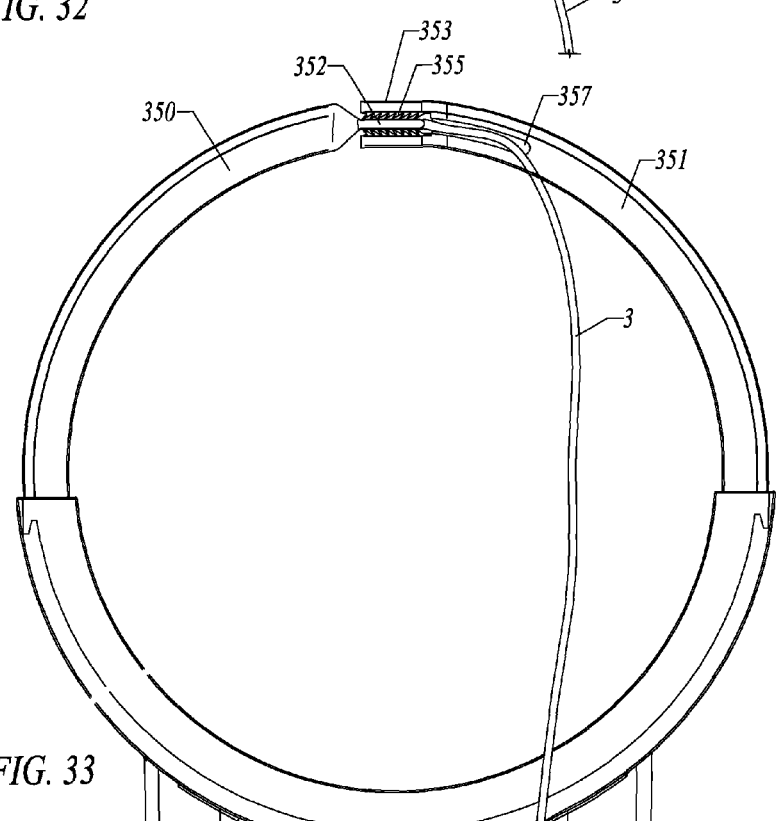
FIG. 33
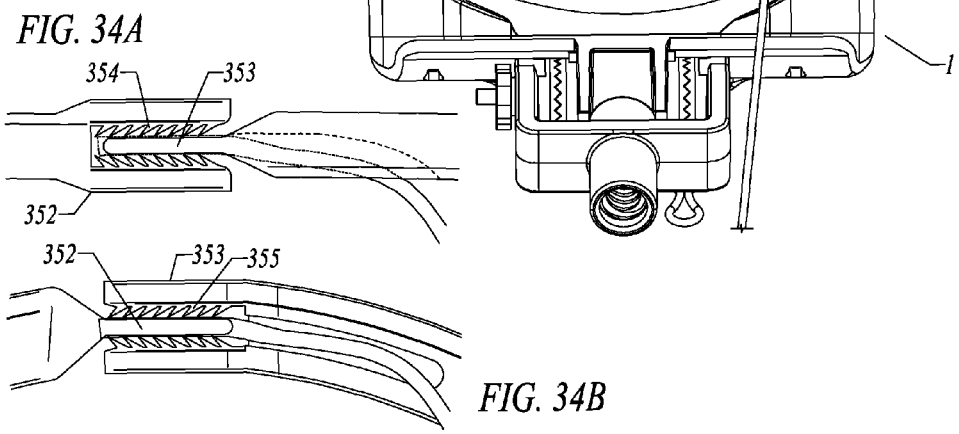
FIG. 34A
FIG. 34B

REMOTELY-OPERATED ROPE-THREADING TOOL

This application claims the benefit of priority to PCT application PCT/CA2009/000556, filed Apr. 27, 2009 which claims the benefit of priority to U.S. provisional application 61/048,203 filed Apr. 27, 2008 and U.S. provisional application 61/145,575 filed Jan. 18, 2009.

TECHNICAL FIELD

This invention relates to a device for threading a rope around an object or through an eye. More particularly, it relates to a tool that can be used in many rope-threading applications.

BACKGROUND ART

There are many situations in which it is necessary or advantageous to thread a flexible member (i.e. line, string, cord, rope, cable, etc.) around an object and through the opening it creates (i.e. branch, bar, pole, log, hole, ring, truss, loop, eye, etc.). From here on, we will refer to the flexible member as a rope and the opening as an eye. Often the eye is out of the reach of the person doing the task. This requires the person to physically move to within reach of the eye to thread the rope through and bring the end of the rope back. Another strategy is to tie the end of the rope to a weight and throw the weight through the eye to pull the rope with it, and then the weight with the end of the rope is retrieved.

Examples of such tasks include but are not limited to:

1) Threading a rope over a branch of a tree or around the trunk to secure a tarp, a clothes line, a swing, a bird feeder, photography or hunting blinds; prevent the tree from toppling; securing a damaged limb; or placing a climbing rope.

2) Lifting objects into the rafters or trusses of a building such as banners, balloons, decorations, lights, sets, speakers, piñatas, or construction materials.

3) Retrieving items across stretches of water such as boats, logs, or sunken objects.

4) Retrieving items from holes such as pipes, tools, or logs, or retrieving fallen animals.

5) Tasks in hazardous environments such as attaching slings to beams in collapsed buildings, securing safety lines to people stranded by fast water, etc.

6) Construction tasks such as securing scaffolding, attaching tag lines during hoisting, securing ladders prior to climbing, or attaching ropes for fall protection.

To accomplish these tasks using current methods requires personnel to incur varying degrees of personal safety risk. People must travel into hazardous environments, climb without fall protection, climb into holes, climb trees and poles, lean over voids, etc. Falls are a major cause of injuries. Throwing objects tied to ropes presents its own disadvantages and hazards. This method requires aiming skill, the weight may come loose and fly unrestrained, the weight may become entangled, the weight may swing back and strike the thrower or others, or the weight may cause damage as it completes its trajectory. The throwing method requires the person to move to another location to retrieve the end of the rope. To accomplish the above-mentioned tasks in a safe manner requires the erection of scaffolding, renting personnel cranes or lifts, or building permanent access structures.

There are many devices devised for passing a rope around an object. U.S. Pat. No. 5,292,160 for a Device for Passing A Rope Around An Object granted to Deichman on Mar. 8, 1994, provides a good description of the prior art and the disadvantages of each. The main detraction is that these devices require the device to be pushed against the object to activate. The other objection is the device must be large in relation to the eye. Deichman attempts to solve these but is not successful because the rope itself pushes on the object. The arm of this device also sweeps a large arc which is a serious disadvantage. Another device that passes a shuttle is U.S. Pat. No. 6,085,681 for a Mooring Hook granted to Morton on Jul. 11, 2000. This device has the disadvantage that it has wide arms relative to the target object, the arms sweep through arcs which would prevent its use if there were other obstructing objects nearby. Also, it is disadvantaged in that it cannot pass a rope through a small hole.

Other devices are found in the prior art; however they have significant disadvantages. Some change width and/or length and therefore require a significant space around the eye to activate. They have a wide path of action so they cannot work in restricted areas. Their activation has a sweeping or rotating action, and they cannot pass a rope through multiple obstacles like bushes or pine boughs. Other disadvantages are that some require a fixed object to act against, therefore they can't thread through soft eyes like a cloth loop on a life preserver for example. Some work with a limited size of eyes, some work on large objects, and some on small objects. The prior art attempts to pass a rope around an object but is not successful in passing a rope around nearly any size of object as well as through a range of hole sizes and configurations. A device to accomplish this would be a significant improvement.

DISCLOSURE OF INVENTION

The basic object of the invention is to provide a tool that will allow people to accomplish the task of threading a rope through an eye in a large variety of circumstances and geometries. The invention is supported by and positioned by a person using a fixed length or telescopic pole. It is light in weight and adjustable for the application and easy to use.

The tool includes a shuttle part to which one end of a rope is attached. The tool is positioned adjacent to the eye and then activated to pass the shuttle with the end of the rope through the eye and the shuttle is secured to the other side of the tool. The tool is then deactivated, which releases the shuttle from its original position, and the tool and shuttle are retrieved together with the end of the rope which is pulled along, threading the rope through the eye as it goes.

With the rope now through the eye with both ends near ground level, loads can be attached to either end of the rope and hoisted into position. Loads can be lifted to any elevation and may be secured permanently or temporarily as desired by tying the rope to an anchor point near ground level.

Often a task does not involve hoisting a load but rather tying the rope to an object to stabilize it or pull on it. In this case, a small loop can be made in one end of the rope and, with the free end passed through this loop, it can be drawn up to the eye to secure the object in a similar manner to using a lariat. Examples using this technique include creating a guy line for a tree or pole or pulling a log or pipe out of a ditch.

A third method that the tool accommodates is lifting a light-weight object and clipping it in place. This requires an alternate version of the shuttle receiver part, which includes an attachment point for a short length of rope and a feature which allows it to release from the tool. The shuttle and the alternate shuttle receiver are left in place, with the short length of rope forming a loop through the eye and the object being placed. Examples using this technique include hanging banners, placing decorations, or hanging balloons.

The invention accommodates eyes with large throat sizes, such as tree limbs and large diameter pipes. It also accommodates small eyes, such as small rings and drilled holes. The invention has an angle adjustment to accommodate, together with rotation of the pole, eyes at various positions relative to the operator. The invention is not limited by the length of the pole and will work at extremely long distances provided there is visibility and the control lines are lengthened. The invention can be adapted to other means of placement and activation (for example, employing robotics and remote vision systems).

Referring now to the Control Line Reels, which are an important part of the current invention but which has applications beyond the Remotely-Operated Rope-Threading Tool. The control line reels will be discussed as it relates to the current invention but will also refer to other uses.

A key element of the invention is the means to control, organize, and make accessible the control lines which activate and deactivate the tool. It is important to keep the control lines tight and in line with the pole to reduce the possibility of snagging the control lines on branches and the like. If the control lines are released from the hand, the lines should not fall away from the operator when the implement pole is not vertical. This necessitates an interruption of operations to retrieve the control lines.

Poles used with the present invention can vary in diameter, and any device must accommodate the range of pole sizes most commonly used. In addition, many of the poles used are telescoping poles. The solution to the line-control problem must accommodate poles of various and varying lengths. The control lines should feed out and feed in, as the telescoping poles are extended and retracted. A means to solve these problems is required that is easy to retrofit to the poles of existing implements.

Some pole-mounted implements require considerable force to be applied through their control lines. This can be hard on the hands gripping the lines, as the thin lines can cut into the fingers. The control line should be easy to grip and not slip when pulled with the required forces.

The current invention, in the preferred embodiment, requires two lines to operate: one to extend and one to retract the mechanism of the device. These two lines increase the need to have the control lines neat, organized, and always within easy reach. This need is compounded by the additional complexity of the rope being threaded in close proximity and in danger of becoming tangled with the control lines.

Also, there exists the possibility that the tool could be activated using only one control line by employing biased springs to deactivate the tool. In this case only one control line reel would be required.

The basic object of the control line reel invention is to provide a means to solve all of the issues mentioned above in an economically advantageous design. The invention employs two main components. Firstly, a retractable reel or reels and secondly, a clamp assembly to which the reel(s) are more or less permanently mounted and which is used to secure the assembly onto a pole.

The reel assembly is of a universal design so that it can be used on clamp assemblies that are designed to receive one or two reels. The reel itself is a retractable spring-powered reel, which includes a drum to wind on a length of webbing. The webbing is long enough to activate a tool when the pole is fully extended. The reel could be offered for sale in several sizes or lengths. The end of the webbing has a clasp to easily attach it to a loop in the end of the tool's control cord.

BRIEF DESCRIPTION OF DRAWINGS

FIG. 2A through 2C are perspective views illustrating the operation of the present invention showing the tool in the placement position, the threading position, and the retrieval position with the eye and pole not shown.

FIGS. 3A and 3B are perspective views illustrating the placement position and the threading position of the tool with the body of the tool removed to show the internal mechanism.

FIG. 4 is a bottom elevation view of the tool, with the body of the tool removed to show the internal mechanism.

FIG. 5 is a side view in cross-section.

FIG. 6 is a perspective view illustrating the same cross-section as FIG. 5 from the opposite direction.

FIG. 7A is a partial cross-section view of the extended arms encircling a large cylinder.

FIGS. 22A and 22B are perspective views of the Double Control Line Reel attached to a telescopic pole and connected to a Remotely-Operated Rope-Threading Tool.

FIGS. 30A and 30B are two perspective views, to illustrate the orientation of the arm path planes in relation to the arm path describing circles.

FIG. 31 is a side view of the tool in section to illustrate the orientation of the arm path planes.

FIG. 32 is a top view of the rope-threading tool, illustrating an alternate arrangement of the arm ends which employ barbed fingers to pass the end of the rope instead of using a shuttle.

FIG. 33 is a side view of the rope-threading tool, illustrating an alternate arrangement of the arm ends which employ barbed fingers to pass the end of the rope instead of using a shuttle.

FIGS. 34A and 34B are enlarged views of the same arm ends from FIG. 32 and FIG. 33.

BEST MODE FOR CARRYING OUT THE INVENTION

Figures 1A, 1B, 1C:
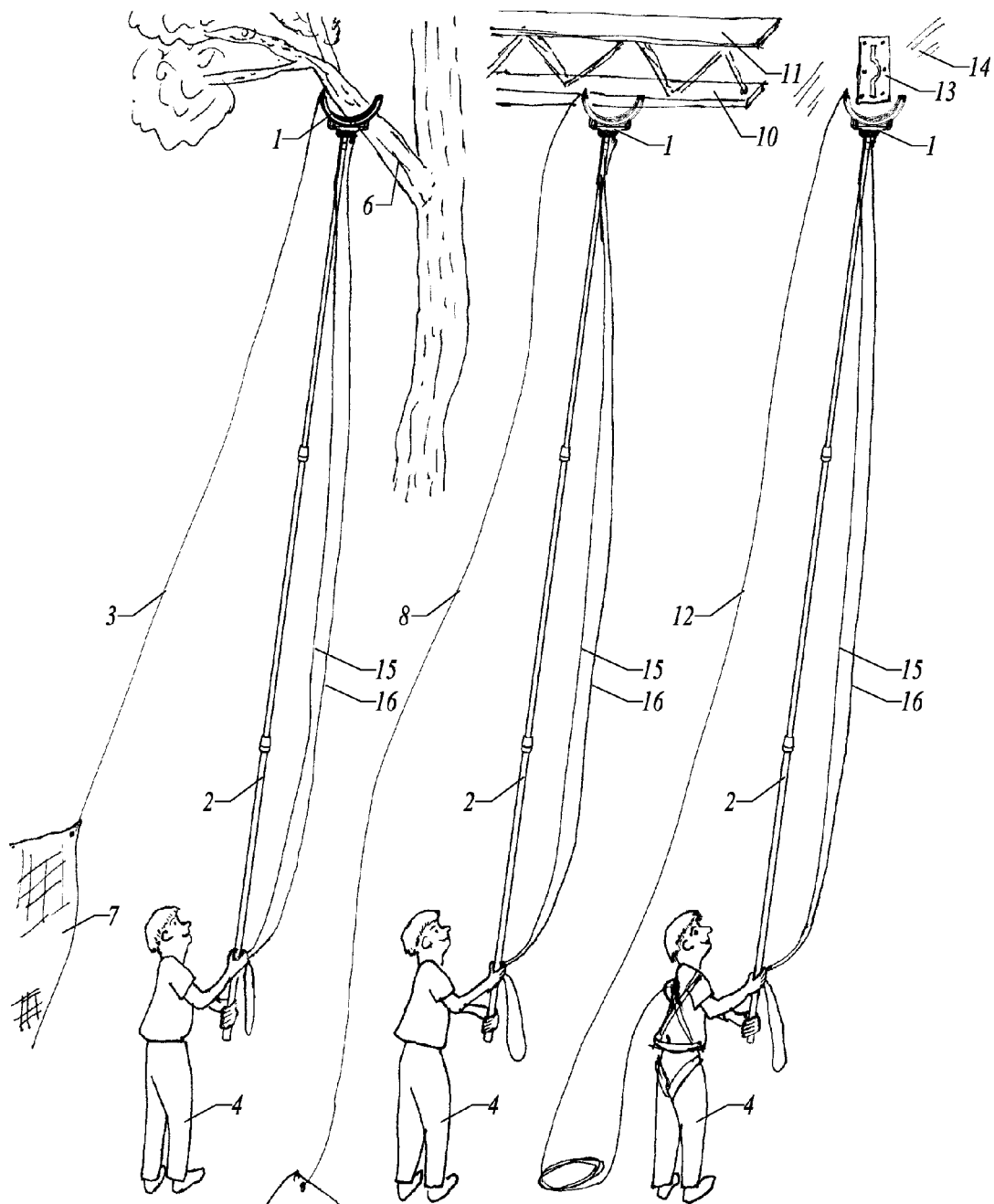
FIG. 1A through 1C are perspective views of a person using the subject tool to place a rope around a tree branch, a truss member, and a wall-mounted eye respectively.

Referring now to the drawings, and in particular, to FIG. 1A, a remotely-operated rope-threading tool 1 is positioned against the underside of an object to be encircled by a rope 3, in this case, a tree limb 6. Because of its light weight, its size and configuration, the rope-threading tool is easily positioned by a person 4 with the aid of a standard extension pole 2. In this illustration, the goal is to thread a supporting rope 3 for a tarp 7 over the tree limb 6 in order to secure the rope 3 with the tarp 7 elevated in the air.

Referring now to FIG. 1B, the example shown is of a person 4 using the threading tool 1 on the extension pole 2 to thread a supporting rope 8 for a banner 9 over a lower member 10 of a roof truss 11 in a building. (The extension pole 2 is shown more clearly in FIG. 12 and FIG. 21.)

Referring now to FIG. 1C, the example shown is of a person 4 using the threading tool 1 on the extension pole 2 to thread a fall-protection rope 12 through a safety ring 13 which is bolted to a wall 14.

Also shown in FIGS. 1A, 1B, and 1C, are a deactivate control line 15 and an activate control line 16 for operating the threading tool remotely, which are connected to the deactivate cord 18 and the activate cord 19 shown in FIG. 2A through 2C and are used to apply the tension forces to control the tool at a distance.

Referring to FIG. 2A through 2C, the remotely-operated rope-threading tool 1 is shown without the extension pole and without the long control lines. The eye is also not shown for clarity. These figures illustrate the action of the tool.

FIG. 2A shows the tool with the arms 30 in the deactivated or retracted position. The arcuate arms 30 are positioned inside the body of the tool 1. The tool is in the ready position, with the rope 3 fastened to a shuttle 47 by passing the rope through a hole in the shuttle and tying a knot 5 in the end of the rope so that the knot will not pass through the hole. In this embodiment of the invention the shuttle 47 comprises the means to retain the end of the flexible member. In this ready position, the deactivate cord 18 is pulled out of the body and the activate cord 19 is retracted into the body. The cords have a loop on the end 20 created by a staple or cord coupler 21 to facilitate the attachment of the control lines. The cord coupler 21 also functions to ensure that the cord connected to each arm pulls at the same time and through the same distance to cause the arms to retract or extend at the same rate, so that the arms both travel through approximately ninety degrees and meet at the center line of the U-shaped opening at the point of convergence. This point of convergence is explained more fully in FIG. 30A, FIG. 30B, and FIG. 31.

A significant advantage of using two arcuate arms in this configuration is that the arms rotate nearly 90 degrees in a semicircular channel to converge and complete the circle, but this leaves 90 degrees of the arm in the channel in the body for stability and strength. The curved arm in the curved channel works to prevent the arms from twisting.

FIG. 2B shows the tool in the activated or extended position. The activate cord 19 has been pulled to cause the arms 30 to extend out from the body of the tool 1 and meet in the middle of the opening. The deactivate cord 18 has been drawn up into the body. The shuttle 47 has engaged a shuttle receiver 55 and locked together. In this embodiment of the invention a shuttle receiver 55 comprises the automatic latching means to capture the end of the flexible member. The rope 3 has been drawn up to the top center of the view by the shuttle 47. For a clear illustration of the paths of the two arms and how these paths intersect, refer to the top elevation view shown in FIG. 17.

FIG. 2C shows the tool again in the deactivated or retracted position. This time, however, the shuttle receiver 55 has pulled the shuttle 47 out of the arm end hole 33 and moved it to the other side of the tool 1, drawing the rope 3 to the other side with it. The arms 30 are pulled back into the body by pulling the deactivate cord 18. The activate cord 19 is again pulled into the body. This figure shows the threading action completed. The next step in the process would be to retrieve the tool with the end of the rope 3 successfully drawn through the eye and yet attached to the tool. The operator would bring the tool and rope back to his hands and then remove the shuttle 47 from the shuttle receiver 55 and return the shuttle to the original position on the end of the other arm. The initial positions of the shuttle and shuttle receiver may be interchanged as both arms are identical so that the shuttle can pull the rope either left to right, as shown in these figures, or right to left.

Using two cords which divide into four cord branches 105 has the benefit of timing the two arms, but they also provide a force feedback function on both activation and deactivation. The operator feels the force required to latch the shuttle and can feel the snap sensation that the shuttle has latched. The operator can sense the force required to deactivate the tool, pulling the shuttle from the arm. The operator can also use the deactivate control line for extra force to pull the rope through an eye that provides considerable resistance to sliding the rope, because the control line is connected directly to the arm so the force does not have to pass through the body of the tool. Tools that use springs to activate or deactivate do not provide this important sensory feedback to the operator.

Referring to FIGS. 3A and 3B, the remotely-operated rope-threading tool 1 is shown in perspective view without the extension pole and without the long control lines and without the body and other supporting structures. The intent is to show only the moving parts to illustrate the function of the tool more effectively. FIG. 3A shows the tool with the arms 30 retracted or deactivated; therefore the deactivate cord 18 is pulled down. The shuttle 47 and the shuttle receiver 55 are shown on the ends of the arms 30. To explain the function in more detail, the activate cord 19 and the deactivate cord 18 are each folded approximately in the middle and, between the two cords, form four cord branches 105 that enter the tool. In order to slide the arms 30 into and out of the tool body in their arcuate paths, the arms must be pulled in and out by the cords. In order to do this action of sliding the arms through approximately 90 degrees, one cord is attached at the inner end of the arm and one cord is attached at somewhat more than 90 degrees along the arm. These cords lay in arm cord grooves 34 located on a convex surface 106 of the arm. These grooves run between the two attachment points of the cords and are wide enough for the two cords to lie side by side. The cords run in the grooves in opposite directions and cross each other such that when one is pulled, the arm moves in that direction and when the other is pulled, the arm moves in the opposite direction. The deactivate cord 18 is attached near the middle of the arm; therefore the arm is pulled into the body when this cord is pulled. The activate cord 19 is attached to the end of the arm; therefore the arm is pulled out of the body when this cord is pulled. In order for the arms to work in unison, the activate cord 19 has two branches, a first branch of the activate cord 19*a* and the second branch of the activate cord 19*b*, which attach to the ends of each of the two arms 30. Likewise, the deactivate cord 18 has two branches, a first branch of the deactivate cord 18*a* and the second branch of the deactivate cord 18*b*, which attach to the middle of each of the two arms 30. These branches are clearly illustrated in FIG. 3B and FIG. 4.

FIG. 3B shows the tool with the arms 30 extended or activated; therefore the activate cord 19 is pulled down. The shuttle 47 and the shuttle receiver 55 are shown connected together after the ends of the arms 30 have converged.

Figure 12:
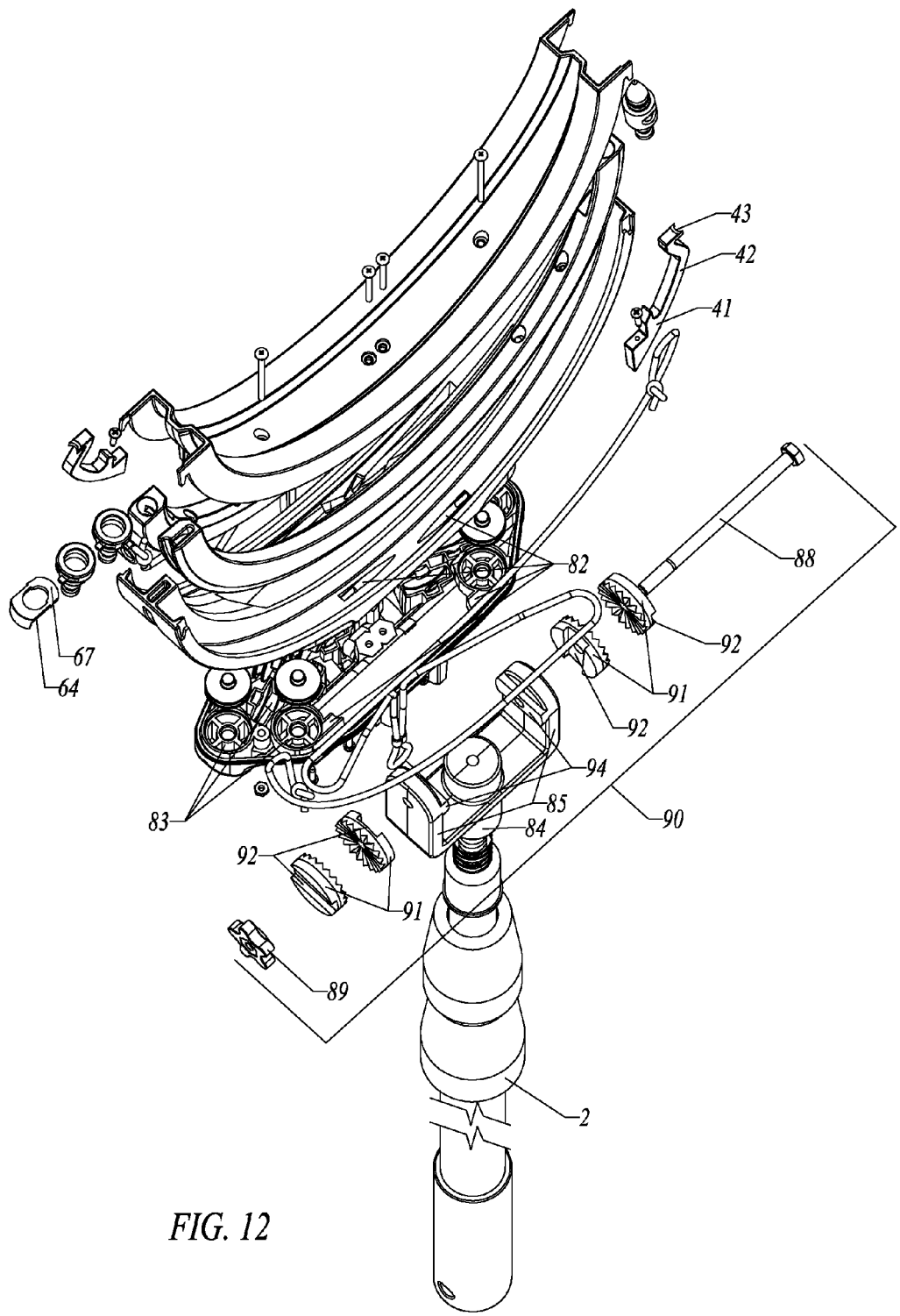
FIG. 12 is another perspective view of the tool with the components in the exploded state to show several components and features more clearly. This view shows the ratchet assembly more clearly.
Figure 13:
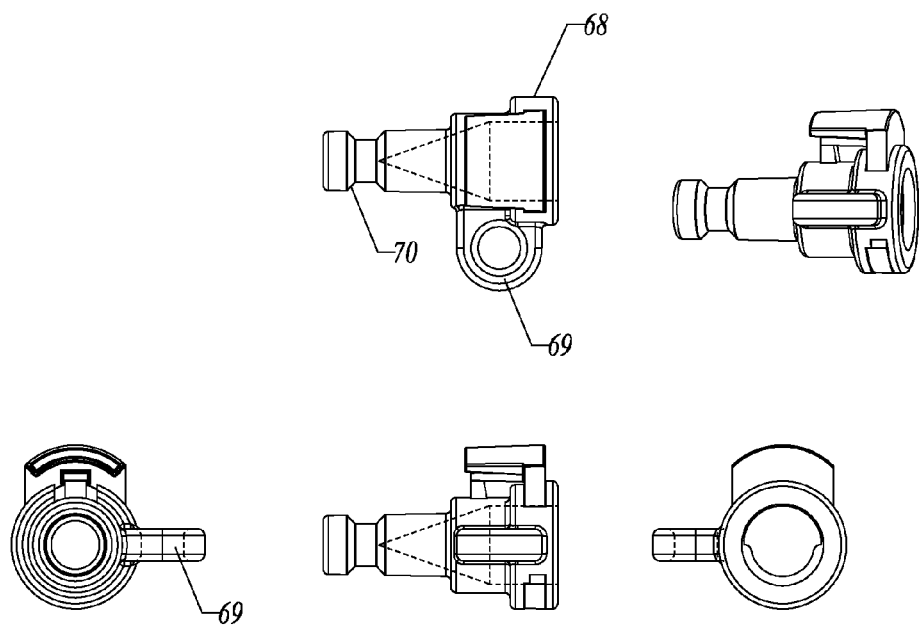
FIG. 13 is four orthogonal views and one perspective view, illustrating the alternate shuttle receiver.

To facilitate the function and maintain control and direction of the four cord branches 105 in the body, several sets of pulleys are employed. These are shown in FIG. 3A and FIG. 3B and also in FIG. 4 (to be described later). These pulleys will be described in order from the arm to the looped ends of the cords. The first set of pulleys are referred to as the horizontal pulleys 23 and have their pitch circles aligned tangentially with the centerline of the cords as they lay in the cord grooves 34 in the arms. (The cord passages 82 shown in FIG. 12 are the paths taken by the cords from the cord grooves in the arms to the first set of pulleys.) Also the plane that lies on the pitch circle is tangent to the pitch line of the arm cord groove so that these pulleys feed the cords smoothly onto and off of the arms as the arms rotate in the body. These horizontal pulleys 23 turn the cords through substantially 180 degrees to line them up with the exits from the body. The second set of pulleys are the vertical redirect pulleys 24, whose purpose is to bend the cords down from the plane of the horizontal pulleys so that the cords can line up tangentially with the third set of pulleys, the exit redirect pulleys 25. These pulleys turn the cords substantially 90 degrees so that they are now moving vertically and line up tangentially with the pitch circles of the fourth set of pulleys, the exit pulleys 26. The purpose of the exit pulleys 26 is to direct the cords smoothly into and out of the tool at all angles of adjustment of the tool and the extension pole (to be discussed later). All the pulleys have a single groove with the exception of the exit pulleys which have two grooves 27 separated by a central rib 28 (visible in FIG. 21). There are four pulleys in the first three sets and only two in the last set.

The arrangement of the pulleys and their position in space is selected to prevent the cords from rubbing on each other or the body and to separate the two branches of each cord and direct them to opposite ends of the two arms. The pulleys reduce the friction produced when pulling the cords around corners, as would be required if the pulleys were not present. The pulleys are present in the preferred embodiment of the invention, but alternative methods could be employed such as using lubrication and/or cord and body materials that could withstand the heat and abrasion of the friction of turning the cords through the required angles.

FIGS. 3A and 3B are good illustrations to show that the tool does not change in overall width as it is activated. Also, due to the relatively thin arms, the tool is only minimally wider than the widest eye it can thread around. FIG. 29A through 29I also illustrate this point very well.

Figures 10, 11:
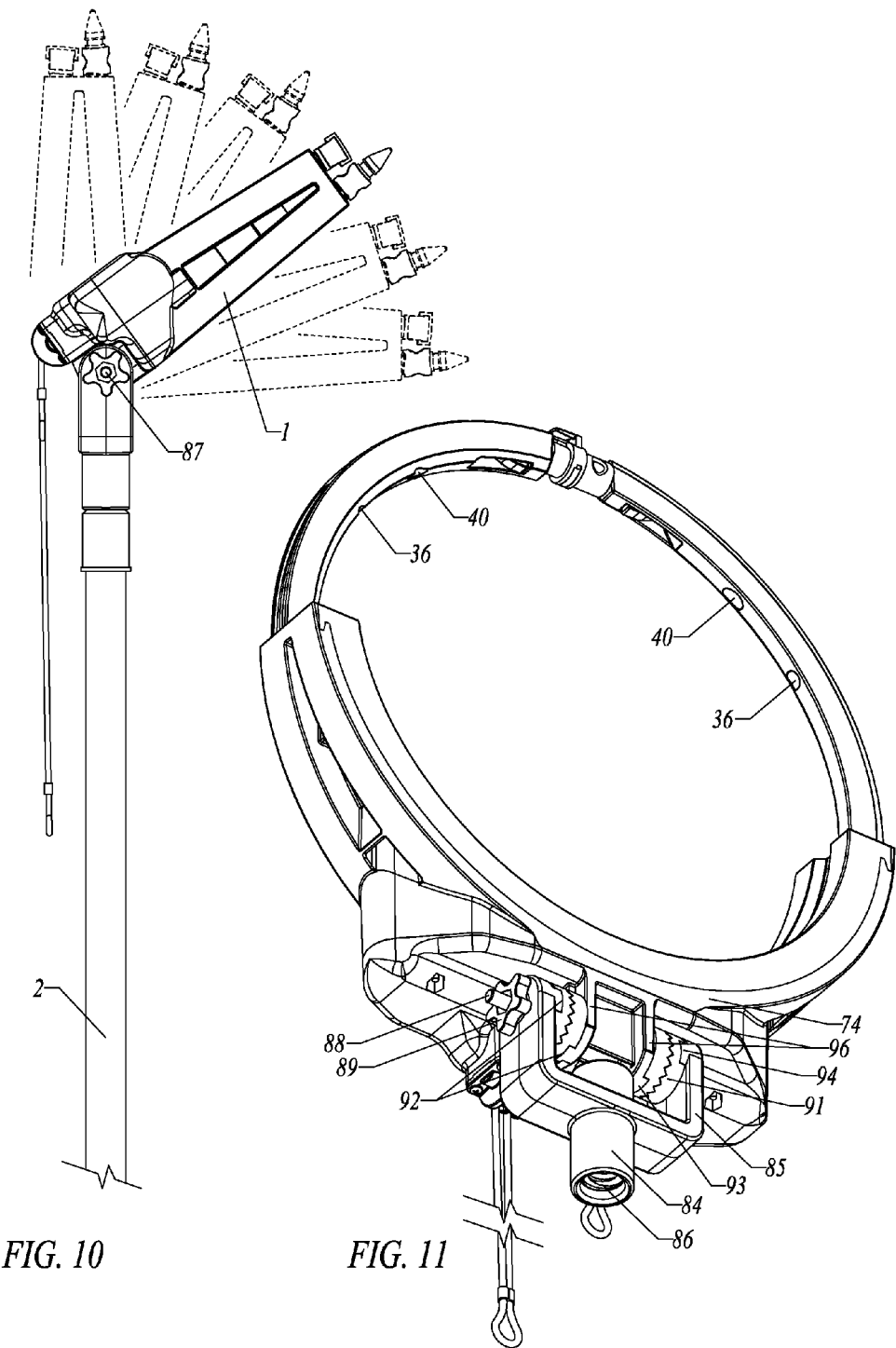
FIG. 10 is a side elevation illustrating the range of angle adjustments of the tool.
FIG. 11 is a perspective view of the tool in the threading position, illustrating the pole attachment and the angle adjustment mechanism.

FIG. 4 is a bottom elevation view of the remotely-operated rope-threading tool 1. As with FIGS. 3A and 3B, the tool is shown without the extension pole and without the long control lines and without the body and other supporting structures. The intent is to show only the moving parts to illustrate the function of the tool more effectively. The tool is shown with the arms 30 in the deactivated position which is the same as FIG. 3A. The shuttle 47 and the shuttle receiver 55 are shown on the ends of the arms 30 for reference. This figure provides another illustration of the features described for FIGS. 3A and 3B. It more clearly shows the arm cord grooves 34 as well as the positions of the cord end anchors 35 and the cord middle anchors 36, of which only one is visible in this figure. (The locations of the middle anchors 36 are also shown in FIG. 11.) Also shown clearly in FIG. 4 is the routing of the activate cords 19 and the deactivate cords 18. The horizontal pulleys 23 are shown on the flat in their position tangent to the arm cord grooves 34. The vertical redirect pulleys 24 and the exit redirect pulleys 25 are shown on edge and on an imaginary line that is tangent with the horizontal pulleys 23 and through a point on the pitch circle of the corresponding groove on the exit pulleys 26. Taken together with FIGS. 3A and 3B, FIG. 4 clearly explains the function of the moving parts of the invention. For an illustration of how the pulleys are positioned in the body of the tool, refer to pulley cavities 83 in FIG. 12.

FIG. 4 clearly shows that the preferred embodiment of the invention positions the working components in a tight cluster near the middle of the tool which is an efficient configuration allowing weight to be reduced as well as manufacturing costs. Lighter weight is significant for tool manipulation on long poles. This configuration also allows the body of the tool to be smaller which is advantageous for servicing a large number of eye configurations, in particular the one illustrated in FIG. 29F.

Referring now to FIG. 5, which is a side view of the remotely-operated rope-threading tool 1 in cross-section, to illustrate the construction details of the body of the tool. The body which houses the moving main functioning parts of the tool consists of four parts: the body cover part 72, the body middle part 73, the body pulley cover 74, and the exit pulley covers 75. These parts are joined together by threaded fasteners, which will be shown more clearly in following figures.

This figure shows the arms 30 in their arcuate grooves in the body, which are formed by the body cover part 72 and the body middle part 73. This figure also shows clearly the cords laying side by side in the arm cord groove 34.

Another important part of the tool is the pole mount 84 which provides the connection to the extension pole (not shown) via the threaded socket 86. The pole mount is connected to the tool via a pivot bolt 88, which is part of a locking pivot arrangement, which will be described clearly later.

FIG. 6 is a perspective view illustrating the same cross-section as shown in FIG. 5 but from the opposite direction. This figure shows the interfaces between the four body parts more clearly. The body cover 72 interfaces with the body middle part 73 and forms the arcuate grooves 34 that guide the arms 30. The cords pass through the body middle part 73 and into the interface area between the body middle part 73 and the body pulley cover 74 where the pulleys reside, with the exception of the two exit pulleys, which are located in the interface between the body pulley cover 74 and the exit pulley covers 75.

This figure shows again the pole mount 84, which provides the connection to the extension pole (not shown) via the threaded socket 86. The pole mount is connected to the tool via a pivot bolt 88, which is part of a locking pivot arrangement, which will be described clearly later.

Figure 7B:
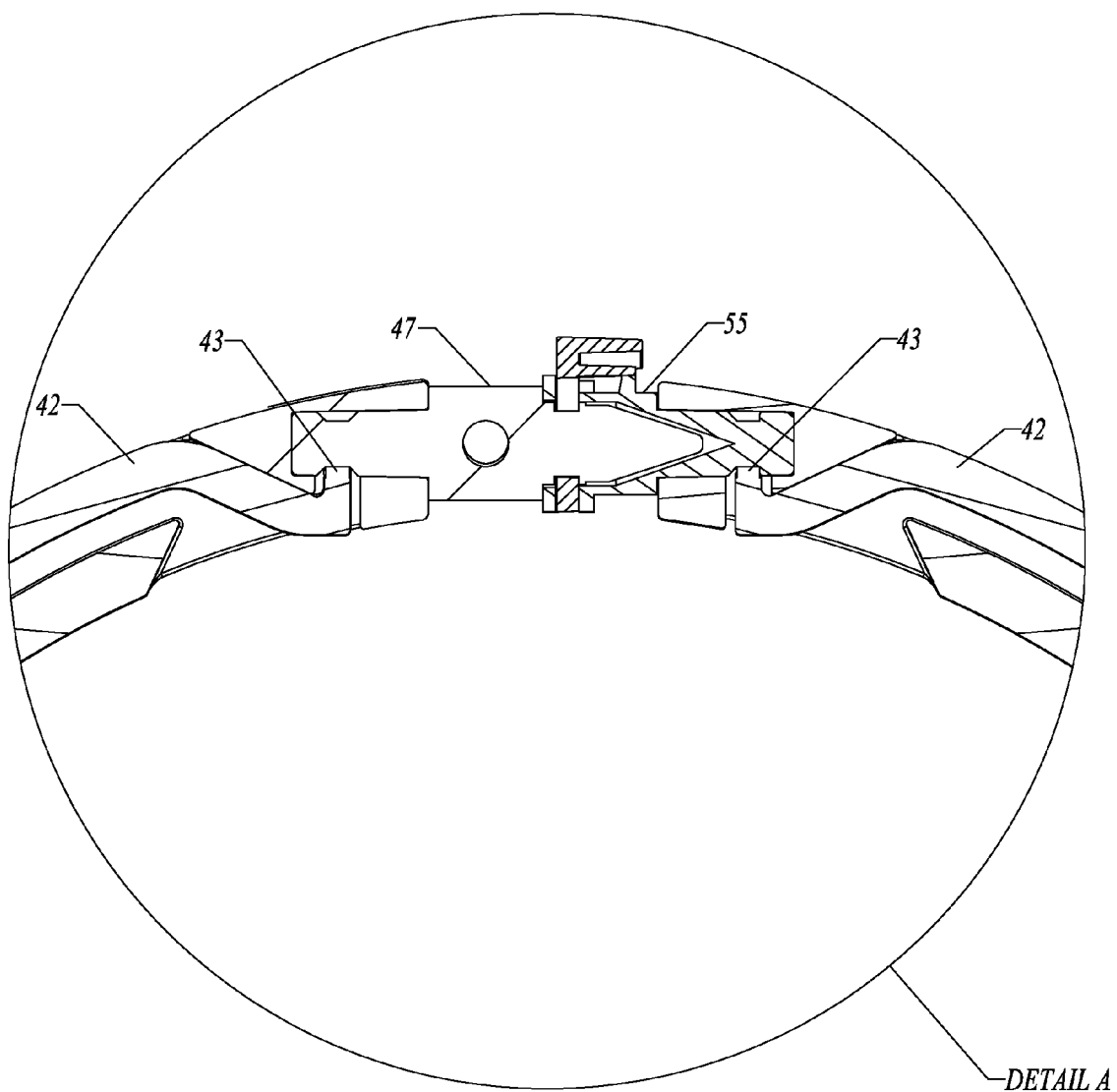
FIG. 7B is an enlarged partial cross-section of a portion of FIG. 7A.

FIG. 7A is a partial cross-section view of the extended arms 30a and 30b, encircling a large cylinder 95 to show the tool in the state where the shuttle 47 is connected to the shuttle receiver 55 at the end of the activation motion when the two arms meet in the middle. At this point, the shuttle 47 is locked in the shuttle receiver 55 so that when the arms are deactivated and move apart, the shuttle 47 will be pulled out of the arm it was carried in and will move the rope (not shown) from the first arm member 30a to the second arm member 30b. Visible in this figure is the deactivate cord 18 with its cord end knot 22 that secures the cord in the arm cord middle anchor 36. This figure also illustrates the means of holding the shuttle in the first arm member 30a and the shuttle receiver 55 in the second arm member 30b. This is accomplished by the two arm detents 41, which are secured in the arms by the arm detent anchor screws 38, which pass through the arm screw holes 40. (The detent anchor screws 38 and the holes in the detents 46 are shown in the exploded view in FIG. 21.) The arm detents 41 engage the shuttle 47 and the shuttle receiver 55 with the detent hooks 43, which are located on the end of the detent spring arms 42. The spring arms 42 allow the detent hooks 43 to deflect to allow the shuttle 47 to be inserted into the arm and then be released when it is pulled on by the shuttle receiver 55. Since the arms and the arm detent parts are identical, it is the shape of the mating grooves on the shuttle and shuttle receiver that determine whether they will be released or held securely. FIG. 7B is an enlarged detail showing items 42, 43, 47, and 55 more clearly. The release and retention of the shuttle and the shuttle receiver will be discussed in more detail while referring to FIG. 8 and FIG. 9. FIG. 12, an exploded view, clearly shows the features of the arm detent 41, the spring arm 42, and the detent hook 43.

Figure 8:
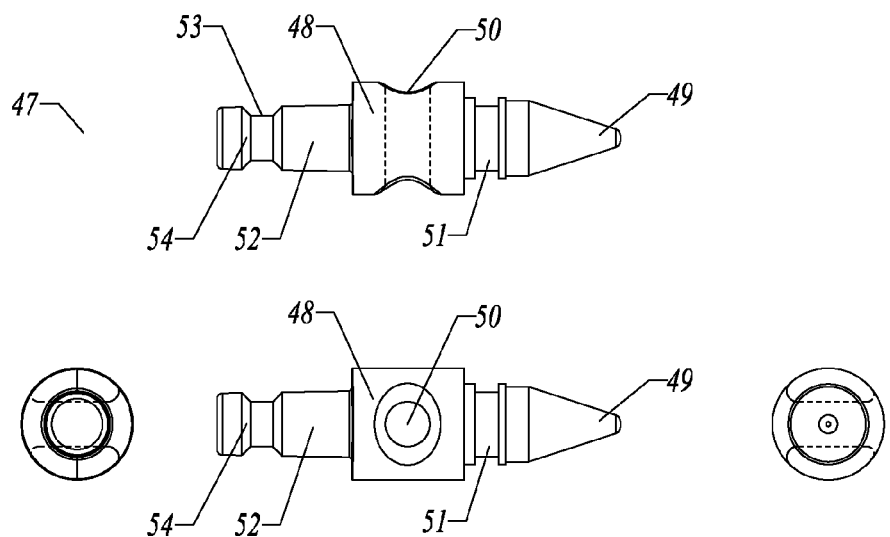
FIG. 8 is four orthogonal views illustrating the shuttle.

Referring now to FIG. 8, which is four orthogonal views of the shuttle 47, we can see the main body 48, which incorporates the rope attachment hole 50. On the left of the main body is the retainer post 52, which is manually inserted into the arm end hole 33 (shown in FIG. 2C) at the beginning of a job. On this retainer post is the retainer groove 53, which engages the detent hook which keeps the shuttle attached to the arm during the tool positioning part of the job. On one side of the groove is the retainer groove conical ramp 54, which provides the means to release the shuttle when it is pulled on by the shuttle receiver. As the shuttle is pulled out of the arm end hole, the conical ramp is forced under the detent hook, and as the hook moves up the ramp, the detent arm spring is deflected. The force to perform this action is provided by the operator via the deactivate control line connected to the deactivate cords which pull the arms apart (not shown).

On the right side of the main body is shown the latching groove 51, which is engaged by the shuttle receiver when the tapered point 49 is pushed in. The tapered point allows for some misalignment between the shuttle and the receiver due to various factors that can cause the arms to move off the theoretical path, such as manufacturing tolerances and/or items pressing against the arms during use.

Figure 9:
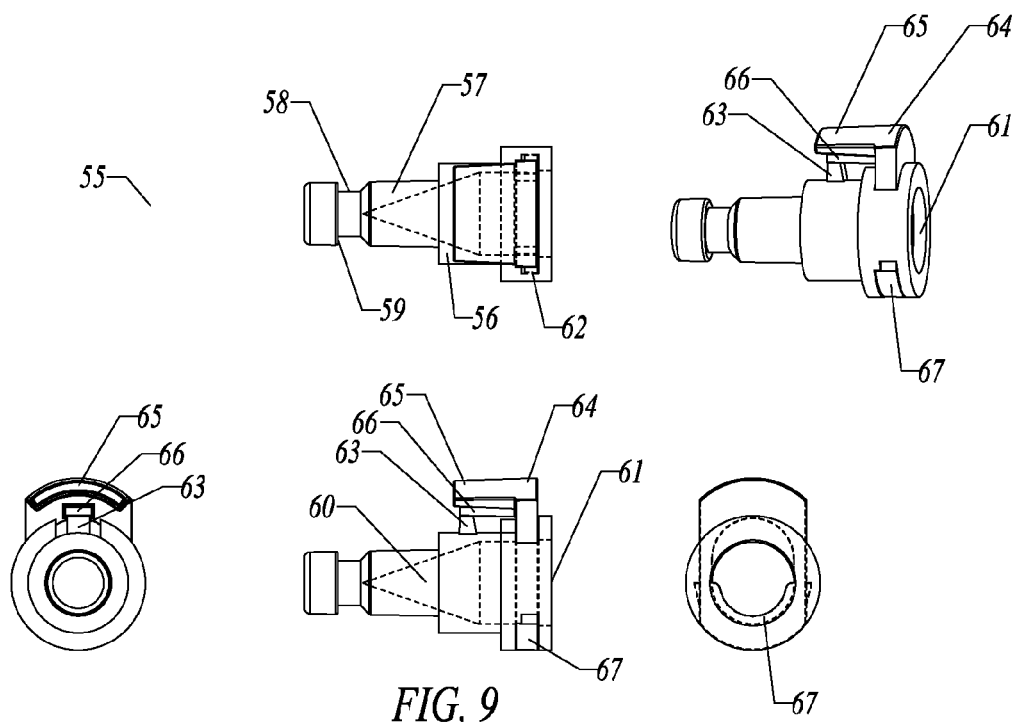
FIG. 9 is four orthogonal views and one perspective view illustrating the shuttle receiver.

Referring now to FIG. 9, which consists of four orthogonal views and one perspective view of the shuttle receiver 55, which is made up of two parts, the receiver body 56 and the receiver clip 64. On the left side of the receiver body is the retainer post 57, which is manually inserted into the arm end hole at the beginning of a job. On this retainer post is the retainer groove 58, which engages the detent hook which keeps the shuttle attached to the arm during the tool-positioning part of the job. This retainer groove differs from the one on the shuttle discussed previously in that the one side of the groove had a straight shoulder 59 instead of a conical ramp. The straight side ensures that the detent hook will not move out of the groove as pulling forces are applied to the shuttle receiver during the deactivation action. The above-mentioned items are involved with securing the shuttle receiver in the arm. The next paragraph's items are involved with capturing and holding the shuttle.

The shuttle's tapered point enters the shuttle receiver mouth 61 as the arms are pulled together and proceeds further into the receiver cavity 60. Surrounding the mouth of the receiver is a clip 64 with a clip latching ring 67, which is like a blade with a hole in it to pass the tapered point of the shuttle. (The receiver clip 64 and the clip latching ring 67 are also shown in the exploded view in FIG. 12.) The latching ring blade moves up and down in the clip groove 62 and is energized in the latched position by the clip latch spring 66. The latch spring is a cantilevered beam, which bears against the clip spring post 63, which is part of the receiver body 56. As the tapered point of the shuttle enters the receiver mouth 61, the tapered point bears on the lower portion of the blade hole, moving the blade down. When the tapered point moves far enough inward and the latching groove on the shuttle is aligned with the blade, the blade snaps up into the latching groove and locks the shuttle in place. The connections of the shuttle in the shuttle receiver and the shuttle receiver in its arm are strong enough to pull the shuttle out of its arm by deflecting the detent hook up the shuttle's conical ramp.

At the end of the job, the shuttle is manually removed from the shuttle receiver 55 by depressing the clip release tab 65 which flexes the latch spring 66 and moves the latching ring blade 67 down and out of the shuttle's latching groove, allowing the shuttle to be extracted.

FIG. 10, FIG. 11, and FIG. 12 illustrate the rotational adjustment assembly 90, which forms an articulated neck and is the means for adjusting the angle of the tool 1 in relation to the extension pole 2 in order to set up the tool for various applications. FIG. 10 shows that, in the preferred embodiment, there are six adjustment positions through 90 degrees of rotation. The tool rotates about the tool angle adjustment pivot 87 to enable the tool to thread a rope around a vertical pole or over an overhead horizontal branch for example.

FIG. 11 and FIG. 12 show the pole mount 84 which connects the tool to the extension pole via the threaded connection 86. The pole mount has two arms 85, which have holes though which pass the pivot bolt 88, which also passes through holes in two lugs 96 on the body pulley cover 74 to create the pivot. The discrete adjustment positions are created by four toothed discs 91, of which two are mated and positioned between each pair of lugs 96 and pole mount arms 85. (Note that in FIG. 12, the discs are shown out of position on the outside of the mount arms due to the exploded view.) The discs have center holes for assembly onto the pivot bolt. The toothed discs are prevented from rotating relative to the arms and the lugs by two mount keys 94 and two body keys 93 that engage the four toothed disc keyways 92. To lock the discs together to make a rigid joint, the pivot bolt is fitted with a pivot release knob 89 which houses a threaded nut. When the knob is turned and the nut is tightened, the toothed discs and key arrangement cannot rotate about the bolt. To make the rotational adjustment, the release knob is loosened to provide clearance for the discs to move apart so the teeth can disengage. When force is applied to rotate the mount relative to the tool body, the clearance along the axis of the bolt permits the ramps of the teeth on the discs to force the discs apart, which in turn deflects the arms of the mount apart and allows the rotational adjustment to occur. When the desired angular position is selected, the pivot release knob is tightened to lock the assembly in place for use.

FIG. 13, FIG. 14, and FIGS. 15A and 15B are now used to describe a variant of the preferred embodiment of the invention. The variant involves two new features on the shuttle receiver, which renders it a new part, the alternate receiver 68 shown in FIG. 13. The first new feature is the alternate receiver lug 69, which is added to provide an attachment point for a rope. The second new feature is the retainer groove conical ramp 70, which provides the same function as the conical ramp 54 on the shuttle illustrated in FIG. 8, which is to allow the alternate receiver to be pulled out of the hole on the end of the arm.

Figure 15A:
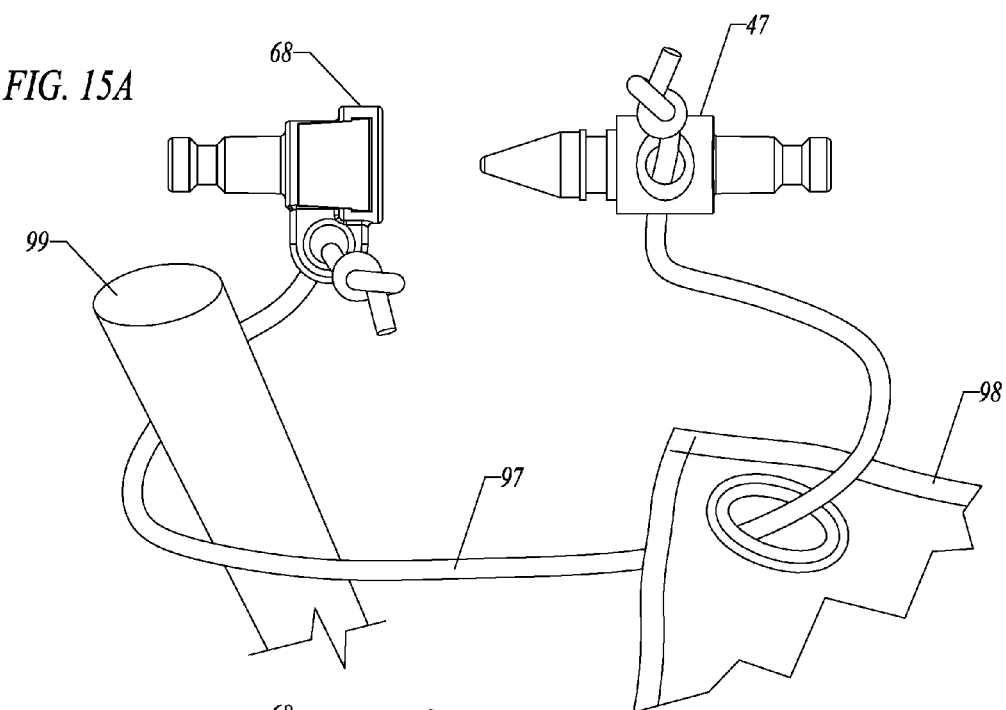
FIGS. 15A and 15B are elevation views, showing the shuttle and the alternate receiver together with the alternate rope arrangement in the unconnected and the connected positions.
Figure 15B:
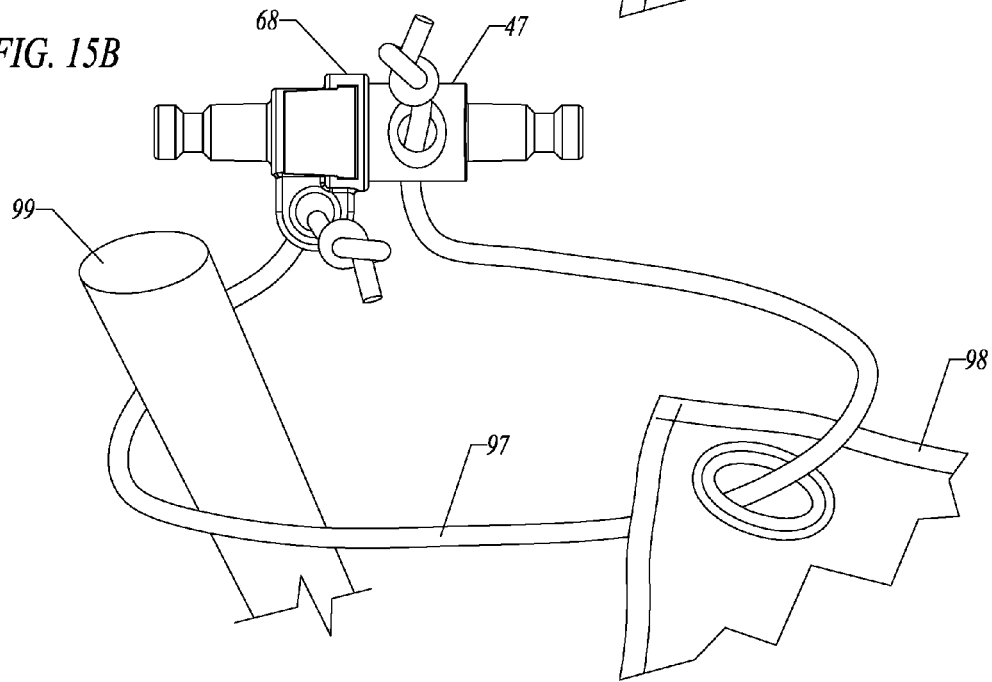

The purpose of the lug and the conical ramp is illustrated in FIGS. 15A and 15B. This arrangement provides a means to more permanently mount an object than by passing a rope through an eye and tying off the rope at ground level. The object can be fastened to a remote anchor point by simply activating the tool and retrieving it, leaving the alternate receiver and shuttle in place at the anchor point. It requires an alternate receiver and shuttle for each anchor point used.

This is accomplished by attaching a short length of rope 97 between the shuttle 47 and the alternate receiver 68. The rope must be long enough for the shuttle and alternate receiver to be inserted in the ends of the arms with the arms deactivated. On the rope is attached a load of some sort; in the illustration, this is shown as the corner of a banner 98, with the rope passing through a grommet. The load must be light enough in weight that it can be lifted or positioned by the tool on the pole. The tool is placed adjacent to the anchor eye and activated. In FIGS. 15A and 15B, this anchor is illustrated as a rod shape such as a branch or stanchion 99. Once the shuttle and alternate receiver are connected, the tool is deactivated and pulled back to release both the shuttle and the alternate receiver from the two arms, leaving the load connected to the anchor.

Figure 14:
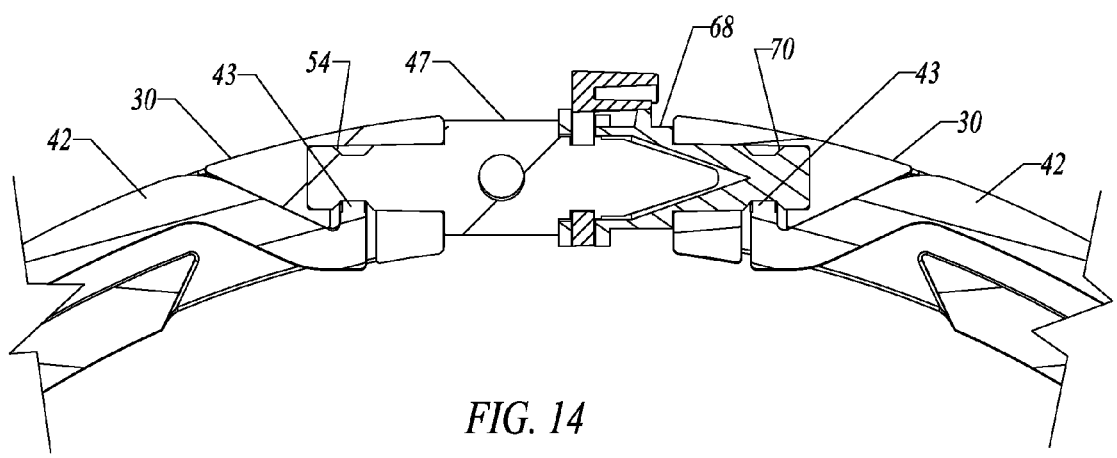
FIG. 14 is a partial cross-section view of the extended arms, showing the connection in the threading position, similar to FIG. 7B but with the alternate receiver.

FIG. 14 illustrates the shuttle 47 and the alternate receiver 68 mounted in the arms 30 and connected. In the cross-section, the alternate receiver conical ramp 70 is clearly shown as being the same as the shuttle conical ramp 54. Both shuttle and receiver are held in the arms by the detent hooks 43 on the detent spring arms 42. It is clear that if the shuttle and receiver are connected and the rope between the two is attached to an anchor, that these items will be pulled from the arms when the arms are deactivated and the tool is moved away from the anchor.

Figure 16A:
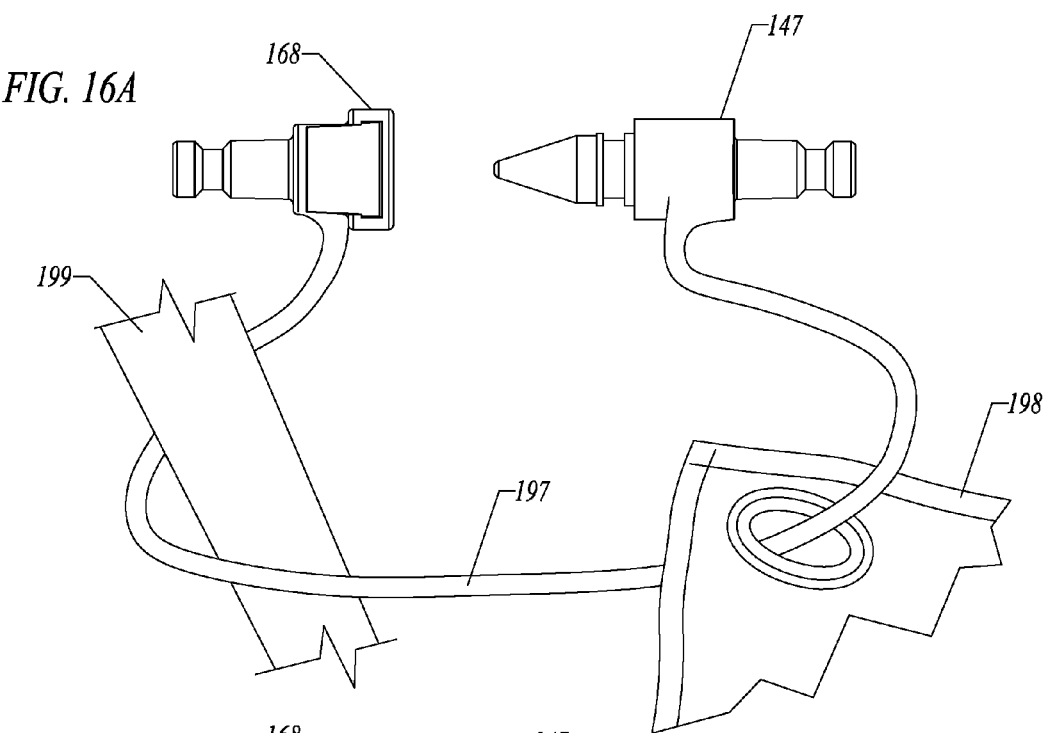
FIGS. 16A and 16B are elevation views showing the alternate one-piece molded shuttle and receiver arrangement in the unconnected and the connected positions.
Figure 16B:
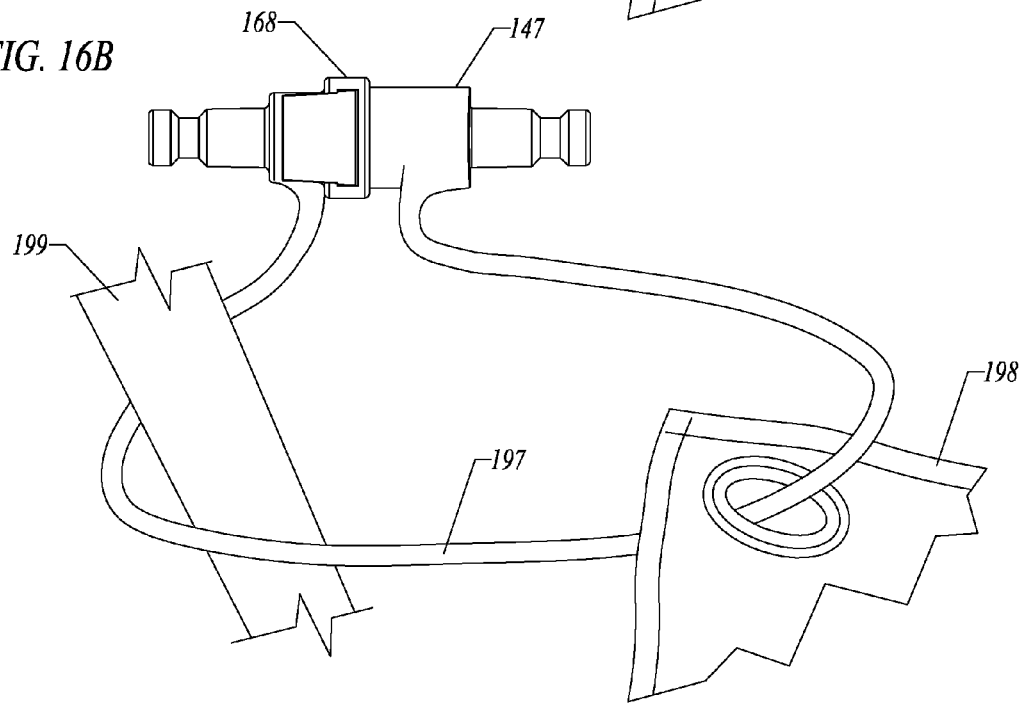

FIGS. 16A and 16B illustrates another embodiment of the arrangement shown in FIGS. 15A and 15B. In this embodiment, the shuttle 147 and receiver 168 are manufactured as a single component. This is accomplished by molding the shuttle 147 and receiver 168 with a flexible polymer member 197 joining them. The thin section of flexible polymer member must be long enough for the shuttle and receiver to be inserted in the ends of the arms with the arms deactivated. The load is suspended from the flexible member prior to activation; in the illustration, this is shown as the corner of a banner 198, with the flexible member passing through a grommet. The load must be light enough in weight that it can be lifted or positioned by the tool on the pole. The load could be a pulley in a block to be used to hoist a heavier load. The tool is placed adjacent to the anchor eye and activated. In FIGS. 16A and 16B, this anchor is illustrated as a rod shape such as a branch or stanchion 199. Once the shuttle and receiver are connected, the tool is deactivated and pulled back to release both the shuttle and the alternate receiver from the two arms, leaving the load connected to the anchor.

Figure 17:
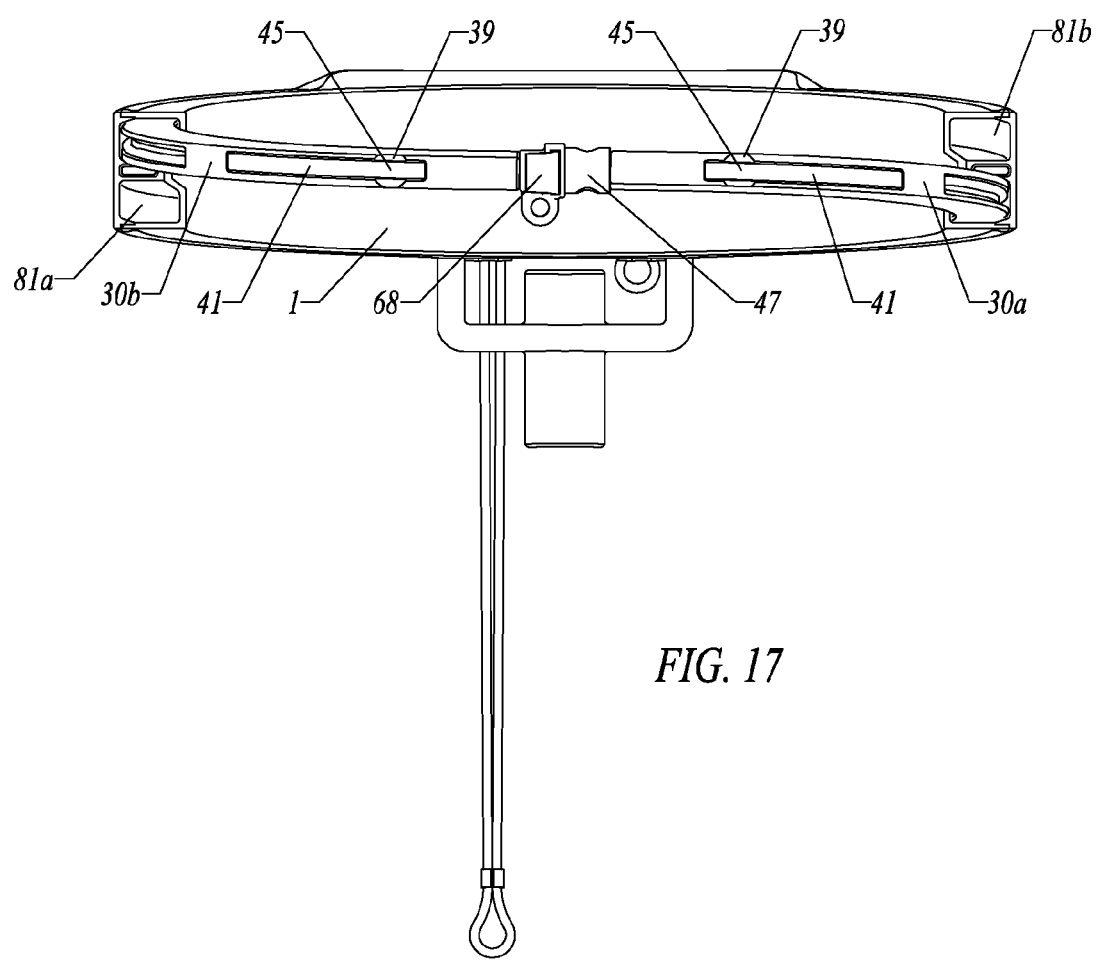
FIG. 17 is a top elevation view of the tool with the arms connected, illustrating the paths the arms travel to join in the middle.

Referring now to FIG. 17, we see a top elevation view which illustrates several features of the remotely-operated rope-threading tool 1 not shown previously elsewhere. This illustration shows clearly the paths that the first arm member 30*a* and the second arm member 30*b* take as they travel out from their respective body arm channels 81*a* and 81*b*. The shuttle 47 and the shuttle receiver 68 (alternate version illustrated here) are constrained to meet at the required positions shown here by the fact that the arcs of the arms and the body arm channels lie on two planes whose intersection line is coincident with the axis of the shuttle and shuttle receiver at the location of their mating.

FIG. 17 also provides a view of the means by which the shuttle receiver 68 (alternate version illustrated here) is installed and released from the arm. It was mentioned previously that the shuttle and receiver can be installed in either arm to maintain symmetry and reduce the number of unique components. Thus, each arm has a detent 41, which has a region on it which is the detent release button 45. This region is aligned with a recess in the arm 39, which provides clearance for a finger to depress the release button. The action of depressing the release button disengages the detent hook (shown previously in FIGS. 7A and 7B) from the retainer groove of the receiver (shown previously in FIG. 9), to release the receiver or to move the detent hook out of the way so the receiver can be inserted. The shuttle 47 is installed in the arm using the same procedure.

Figure 18:
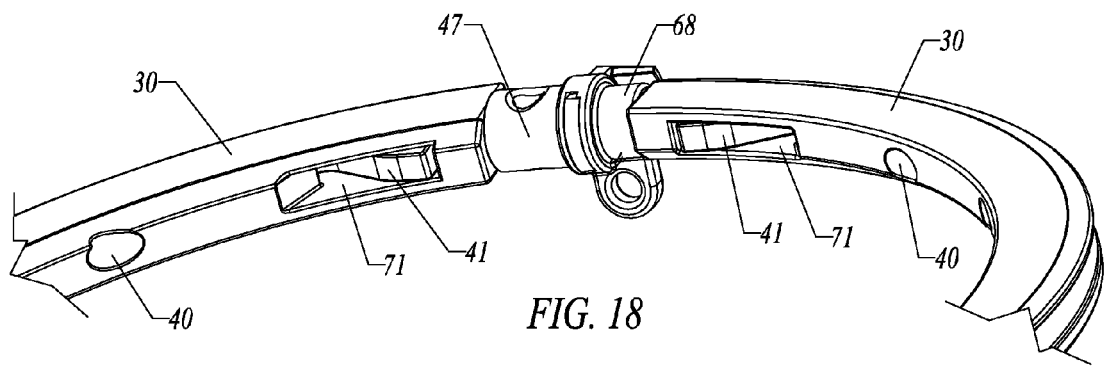
FIG. 18 is a partial perspective view of the arms connected by the shuttle and the alternate shuttle receiver.

FIG. 18 illustrates the arms 30 and detents 41 viewing from inside of the arc. Here we see arm detent slot 71 in the arm, which allows the detent hook to flex and move out of the retainer groove as the shuttle 47 is pulled by the receiver 68 (alternate version illustrated here) on deactivation, or when the detent push button is depressed.

The unique arrangement of the arm, arm detent slot, detent, and body arm channel, provides a locking function for the shuttle so that it can not be inadvertently pulled out of the arm during tool positioning and prior to activation by the operator. This is accomplished by the fact that in order for the detent hook to leave the retainer groove in the shuttle or receiver, the detent arm must protrude somewhat from the slot as it flexes. However, prior to activation, the end of the arm resides inside the body arm channel where there is no space for the detent to protrude; therefore the shuttle is locked in the arm until the arm is activated and the end of the arm leaves the channel.

FIG. 18 is another illustration where the arm screw holes 40 are visible. These holes, together with the screws they conceal, are shown in cross section in FIG. 7A and are also shown in the larger context in FIG. 11.

Figure 19:
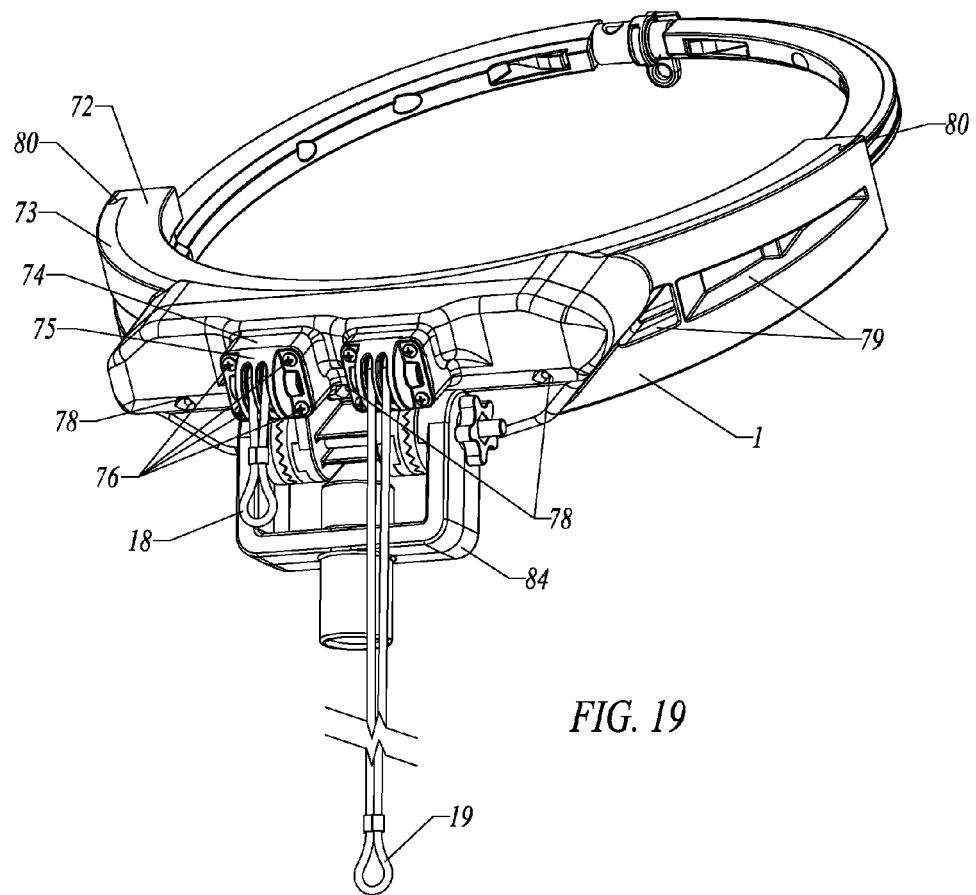
FIG. 19 is a perspective view of the tool to show how the control lines exit the tool.

Previously we described the rotational adjustment of the tool illustrated in FIG. 10, FIG. 11, and FIG. 12. Now we will discuss several other features that are required due to this adjustment capability by referring now to FIG. 19. The rotational adjustment puts the main plane of the tool 1 out of alignment with the pole mount 84 and extension pole (not shown). In order to keep the activate cord 19 and deactivate cord 18 aligned with the extension pole for ease of use, and so the cords run freely, exit pulleys are employed. (The exit pulleys 26 are described previously and illustrated in FIG. 3A and shown in exploded view in FIG. 21.) FIG. 19 illustrates how these are retained in the body pulley cover 74 by means of the exit pulley covers 75, which are fastened to the body pulley cover by the self-threading screws 76. (74, 75, and 76 are shown in the exploded view in FIG. 21.) The exit pulley covers each have two slots for the cords to exit and to guide the cords onto the exit pulleys without tangling.

Figure 21:
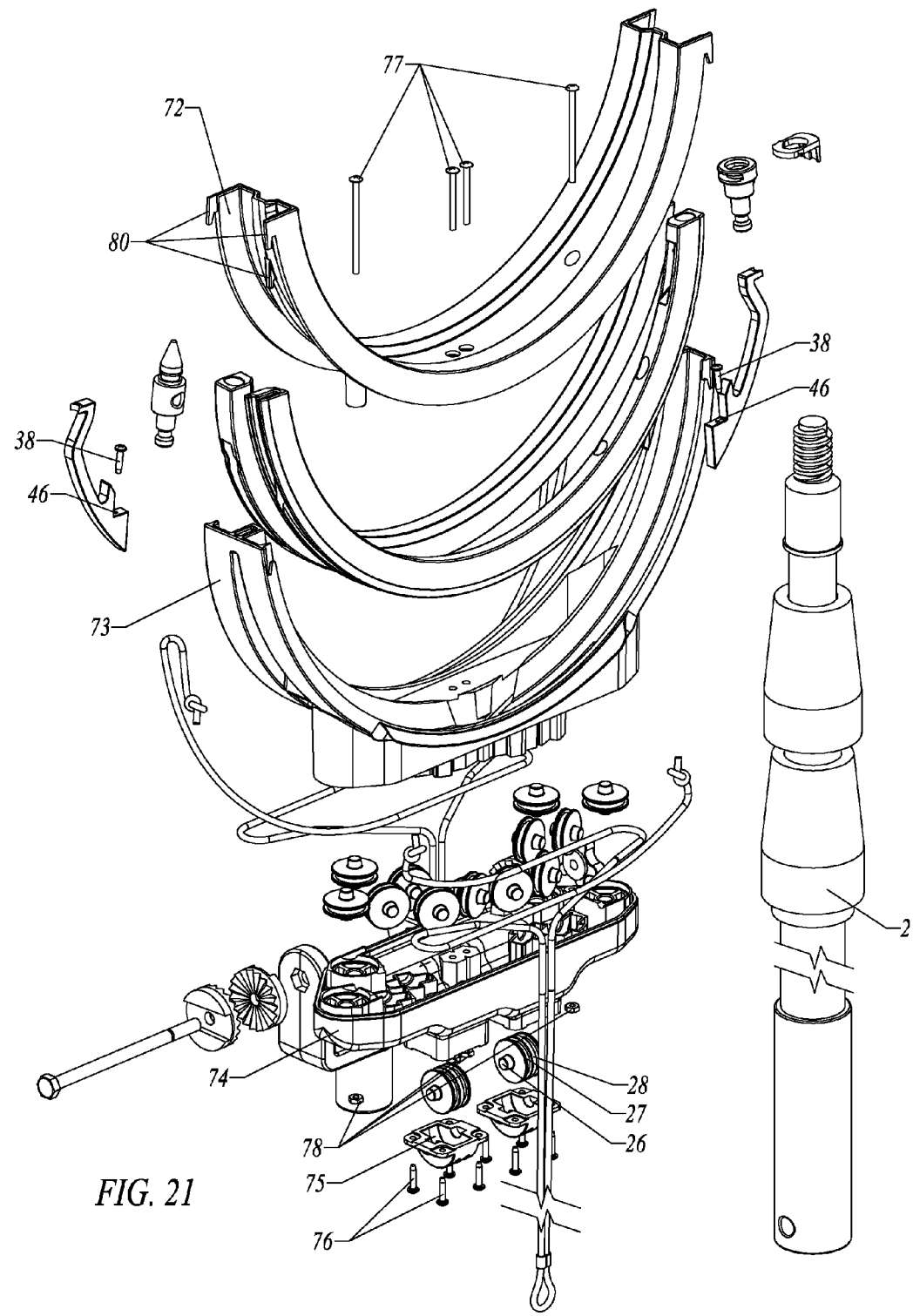
FIG. 21 is a perspective view of the tool, with the components in the exploded state to show several components and features more clearly. This illustration is a better view of the exit pulley features.

Other features illustrated in FIG. 19 and also shown in exploded view in FIG. 21, are the body assembly nuts 78, which are on the ends of the body assembly screws 77 (not shown here, see FIG. 21) and hold the main parts of the tool body together. Also visible are the body alignment features 80 which, together with the body assembly screws and nuts, keep the body cover 72 connected and aligned with the body middle part 73.

Another feature shown in FIG. 19 is the body lightening features 79, which reduce the weight of the tool to make handling on the end of the long extension pole easier.

Figure 20:
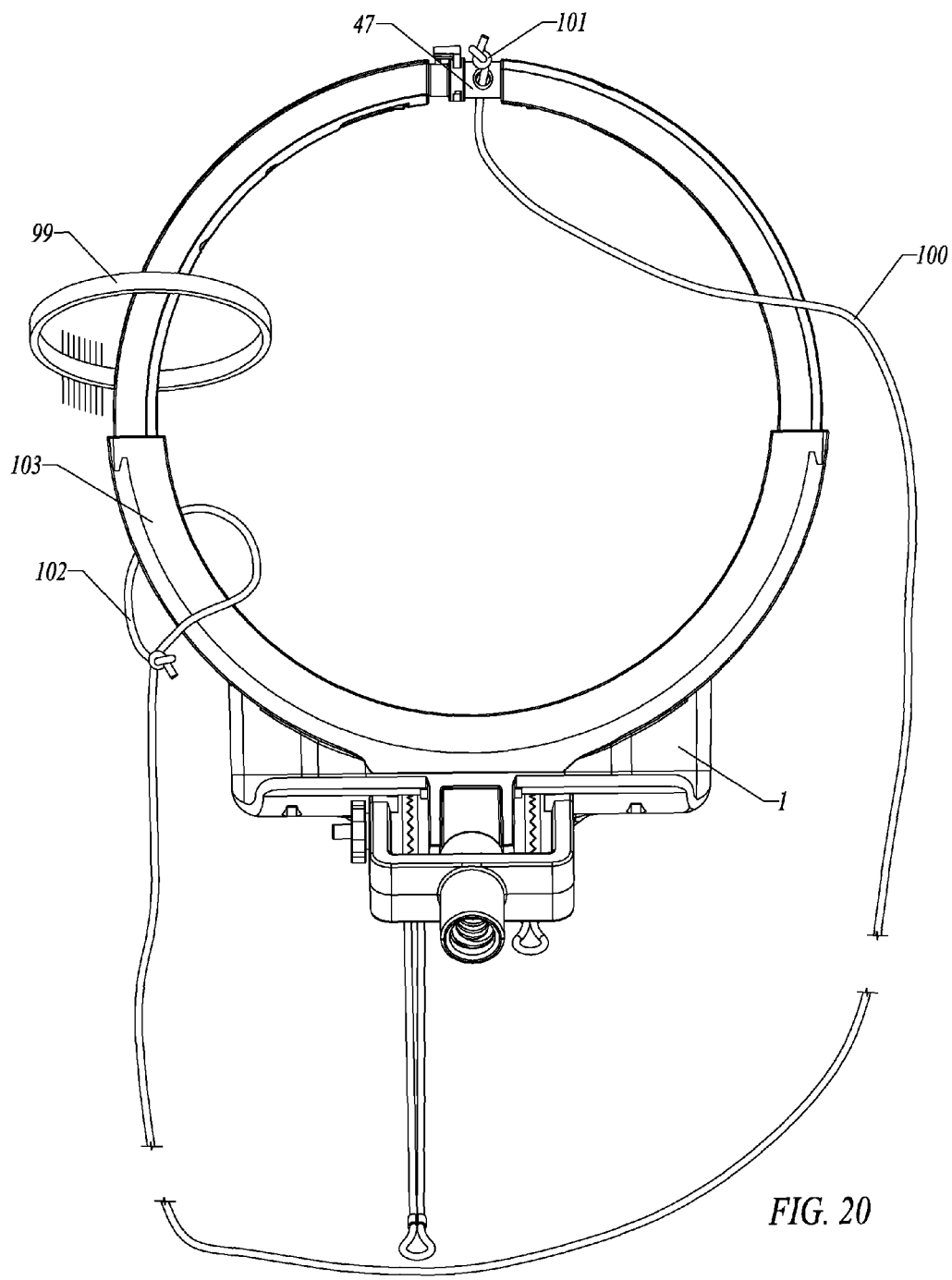
FIG. 20 is a front elevation of the tool showing the arms in the activated position and illustrating a rope-installation technique.

FIG. 20 shows the tool in the activated position to illustrate a rope installation technique. This is the lariat style of rope attachment and is a more permanent type of connection. This technique uses almost half as much rope since only one length of rope is used between the target eye and the operator or selected anchor point. In this illustration the extension pole is not shown. To set up the technique, the rope 100 is attached to the shuttle 47 with a knot 101 as usual. The other end of the rope is formed into a small loop 102 and placed over the shoulder of the body of the tool 103 opposite the shuttle. The tool is then positioned adjacent to the target eye 99 and activated as illustrated. When the tool is deactivated, the shuttle 47 and knot 101 will be drawn through the eye. As the tool is pulled back to the operator, the rope will double up until tension is applied to both legs of the rope, at which point the loop 102 will be pulled off of the body shoulder 103, forming a lariat, and will slide up the other leg of the rope towards the target eye 99. When the loop reaches the eye, the lariat tightens. The operator retrieves the free end of the rope from the shuttle and applies further tension or pulls in whichever direction the job at hand requires. The end of the rope could then be tied off to a suitable anchor point.

FIG. 21 provides another perspective exploded view of the tool, which highlights the exit pulley side of the tool. This figure is provided for reference of other features described in the text above which required more views for clarity. Highlighted are body connection details, detent connection features, and exit pulley details.

Referring now to the drawings illustrating the control line reels: The problem this part of the invention seeks to solve is aptly illustrated by the loose control line shown in FIGS. 1A, 1B, and 1C. Contrast those illustrations with the illustrations in FIGS. 22A and 22B which show the remotely-operated rope-threading tool 1 with extension pole and double control line reel assembly 201, and it is clear that the control lines reels 203 provide a significant advantage.

FIG. 22B shows a pair of spring-loaded spools 203, similar in function to popular dog leash spools that would be housed together and could be fastened to the lower section of the telescopic pole 2. The control lines 205 would be clipped to the activate and deactivate cords 204 and, as the pole 2 is extended, the lines would spool out and keep the lines taut during tool placement and use. As the tool 1 is activated and deactivated, the respective line would feed out or feed in as required.

Figure 23A:
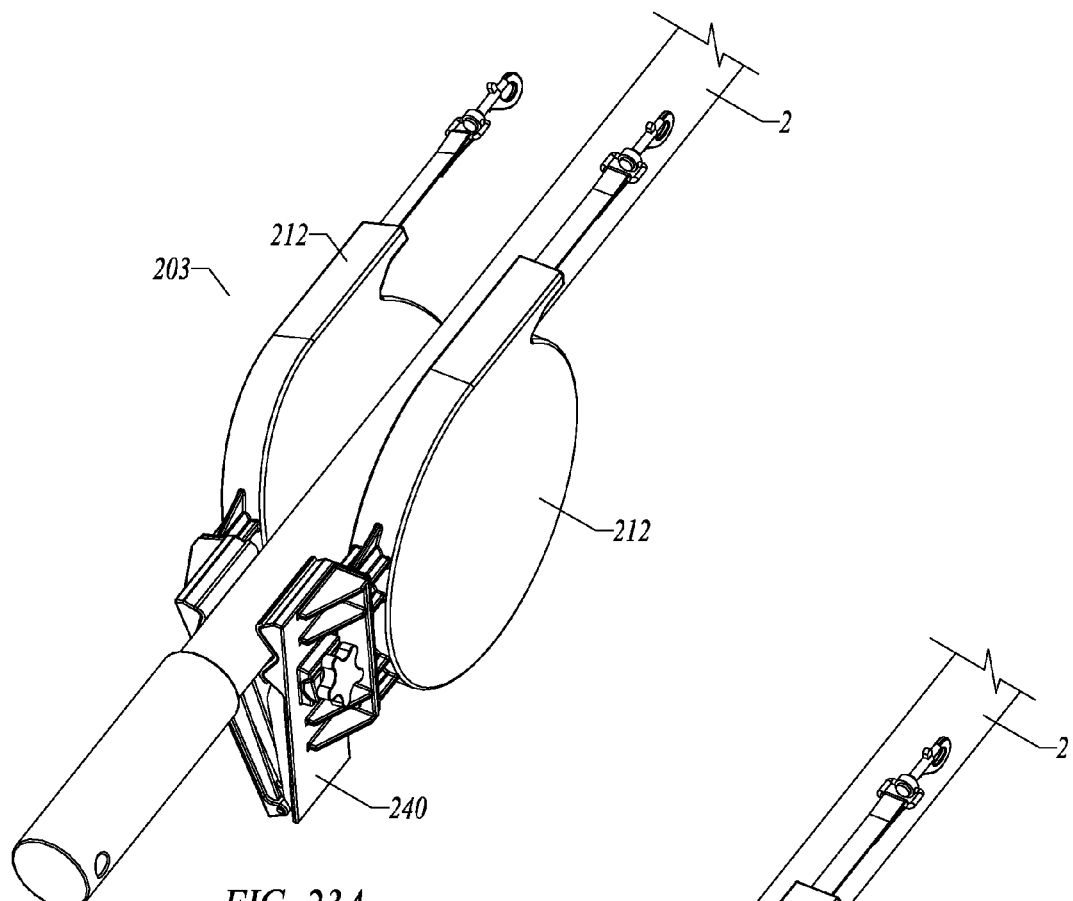
FIGS. 23A and 23B are perspective close up views, illustrating the Double and Single Control Line Reels attached to poles with the webbing retracted.

FIG. 23A is a close up view of the double control line reel assembly 203 mounted on the extension pole 2 showing two webbing reel assemblies 212 and the double clamp assembly 240.

Figure 23B:
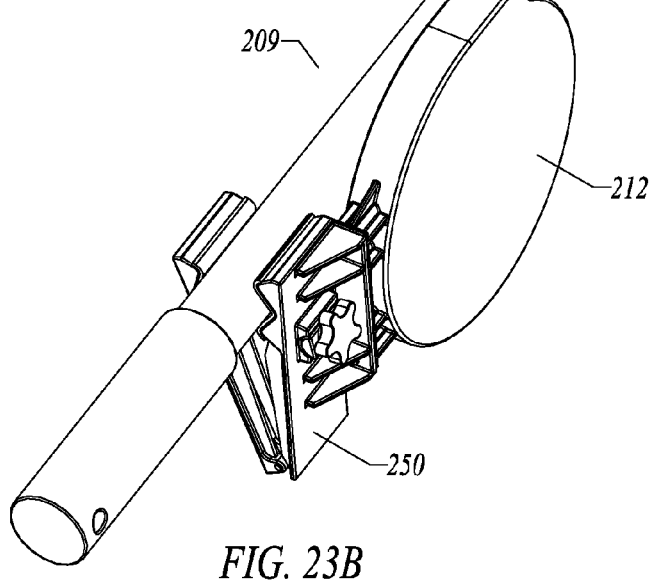

FIG. 23B is a close up view of the single control line reel assembly 209 mounted on the extension pole 2 showing the webbing reel assembly 212 and the single clamp assembly 250. A single control line reel assembly would be used in the event only one control line was used to activate the tool and the deactivate function was accomplished employing biased springs.

Figures 24A, 24B:
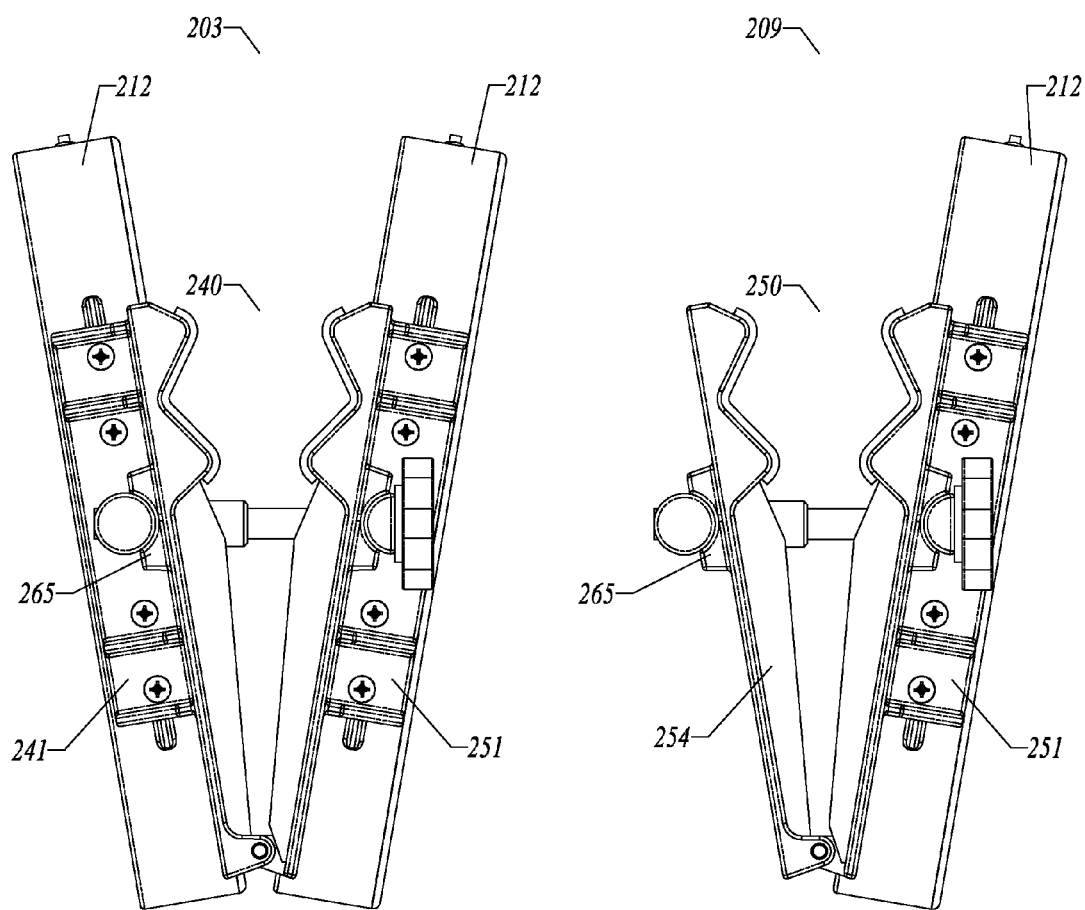
FIGS. 24A and 24B are end views, illustrating the differences between the Double and Single Control Line Reels.

FIGS. 24A and 24B are end views illustrating the differences between the double and single control line reels. The features of the double control line reel assembly 203 that are noted are: webbing reel assembly 212, double clamp assembly 240, left hand clamp half with mount 241, right hand clamp half with mount 251, and the barrel nut socket 265.

FIG. 24B illustrates the features of the single control line reel assembly 209 which are: webbing reel assembly 212, single clamp assembly 250, right hand clamp half with mount 251, left hand clamp half without mount 254, and the barrel nut socket 265. Note that the items 241 and 254 are interchangeable.

Figure 25:
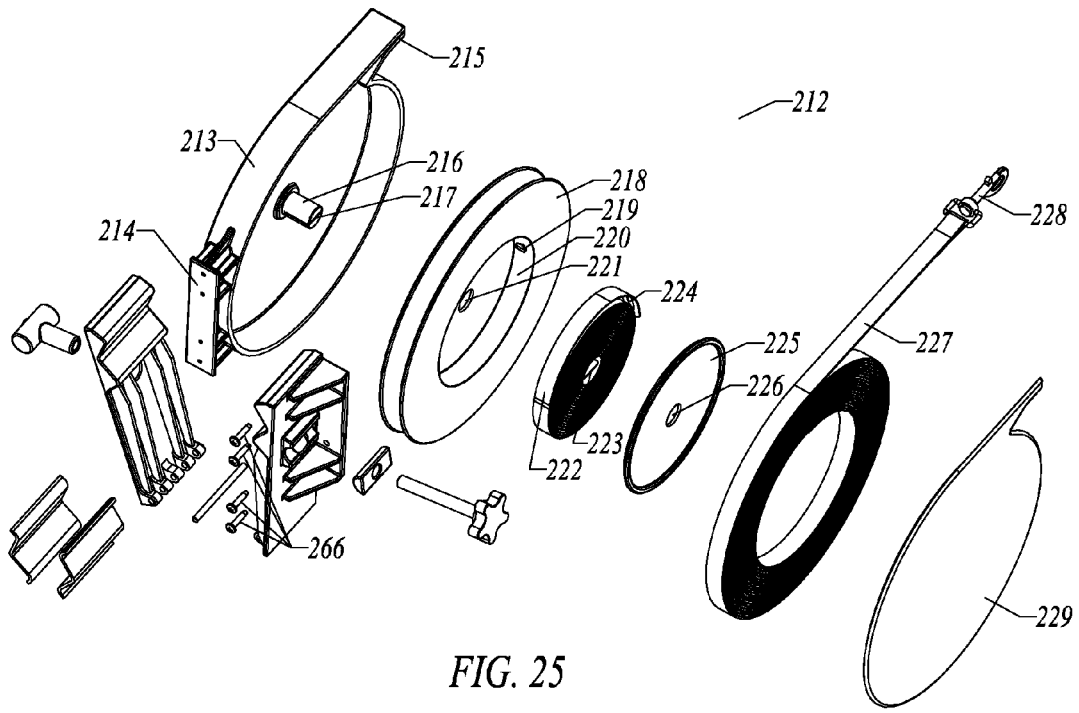
FIG. 25 is an exploded view of the Single Control Line Reel to show primarily the components of the Reel Assembly.

FIG. 25 illustrates the components and features of the webbing reel assembly 212 which are: the webbing reel housing with mount 213, housing mount 214, webbing exit 215, shaft 216, shaft slot for spring connection 217, webbing drum 218, webbing drum spring connection 219, spring cavity 220, inner bearing hole 221, coil spring 222, spring inner connection 223, spring outer connection 224, webbing drum spring cover 225, outer bearing hole 226, webbing 227, webbing clip 228, webbing reel housing cover 229, and mounting screws 266.

Figure 26:
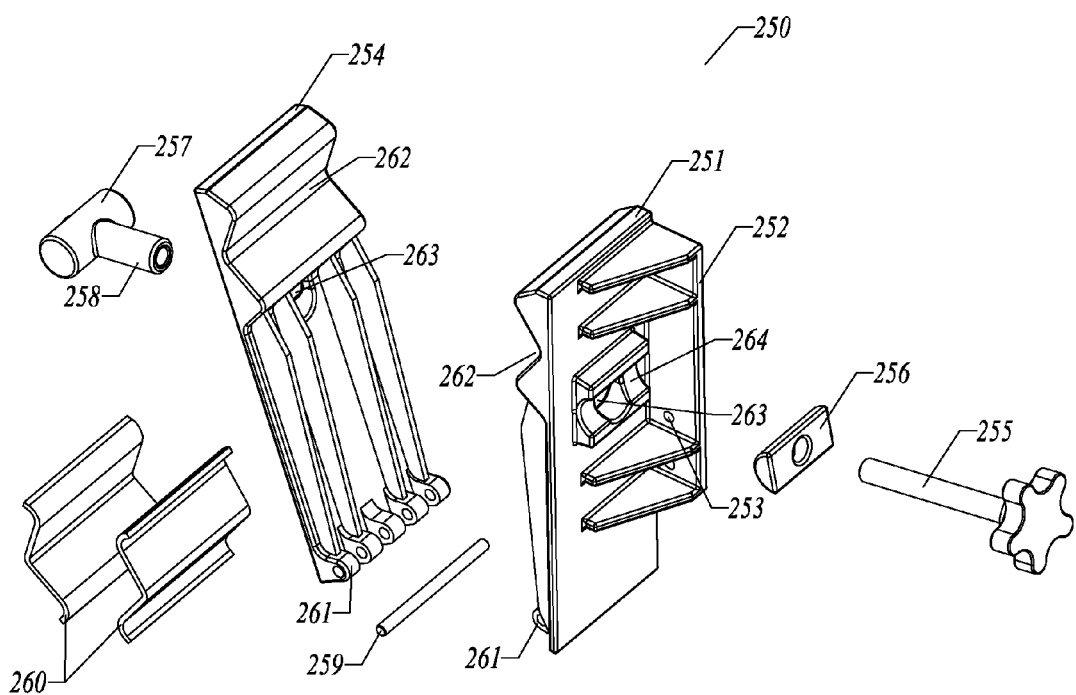
FIG. 26 is an exploded view of the Single Control Line Reel clamp assembly.

FIG. 26 illustrates the components and features of the single clamp assembly 250 which are: the right hand clamp half with mount 251, clamp mount 252, screw holes 253, left hand clamp half without mount 254, thumb screw 255, barrel washer 256, barrel nut with extension tube 257, threaded extension tube 258, hinge pin 259, friction pads 260, clamp hinge lugs 261, pole clamp recess 262, thumb screw hole 263, and the barrel washer socket 264.

Figures 27, 28:
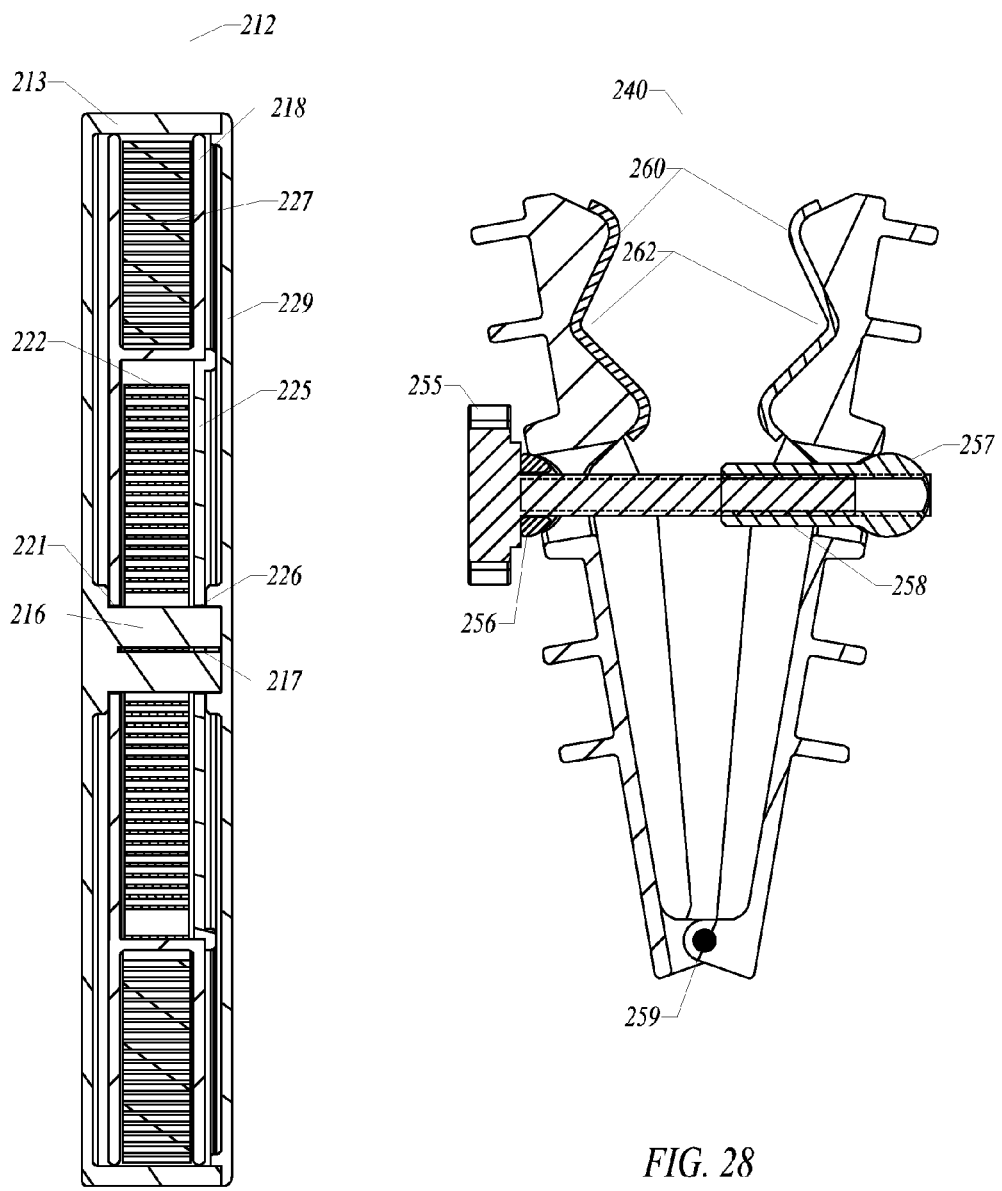
FIG. 27 is a cross-section view through the Reel Assembly.
FIG. 28 is a cross-section view through the clamp assembly to show the tightening mechanism.

FIG. 27 is a cross-section view through the webbing reel assembly 212 illustrating the components and features which are: the webbing reel housing with mount 213, shaft 216, shaft slot for spring connection 217, webbing drum 218, inner bearing hole 221, coil spring 222, webbing drum spring cover 225, outer bearing hole 226, webbing 227, and the webbing reel housing cover 229.

FIG. 28 is a cross-section view through the double clamp assembly 240 to show the tightening mechanism. The components and features of note are: the thumb screw 255, barrel washer 256, barrel nut with extension tube 257, threaded extension tube 258, hinge pin 259, friction pads 260, and the pole clamp recess 262.

FIGS. 29A through 29I illustrate the advantages of using two arcuate arms sliding in circular paths. The paths of motion of the arms are small in cross section, allowing for successful deployment and rope-threading in a large number of eye configurations. The eye configurations illustrated are only in one plane with the eye in cross section, however there are nearly infinite eye configurations that are possible to thread if out-of-plane orientations are considered. The eye cross sections are not intended to be exhaustive. The illustrations show that the remotely-operated rope-threading tool 1 works in restricted areas. None of the prior art has a smaller envelope to the sides and beyond the target/eye than the preferred embodiment of the invention. Note also that the preferred embodiment does not change width.

The tool does not require a rigid target to work against in order to activate or deactivate. The tool can place the rope and be removed with minimal disturbance, which may be useful in animal husbandry or other applications. Only the rope need make contact with the eye.

Figure 29A:
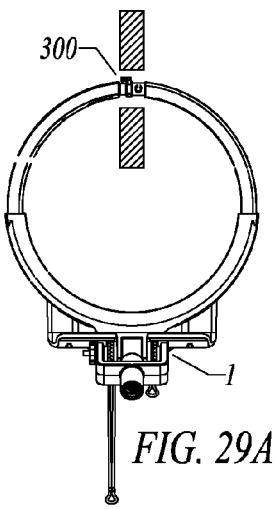
FIGS. 29A through 29I are nine illustrations showing the rope-threading tool with the arms extended to pass the rope through a variety of eye configurations.

FIG. 29A illustrates an eye 300 which is oriented in line with the center of the tool 1 so that the shuttle and receiver converge inside the eye.

Figure 29B:
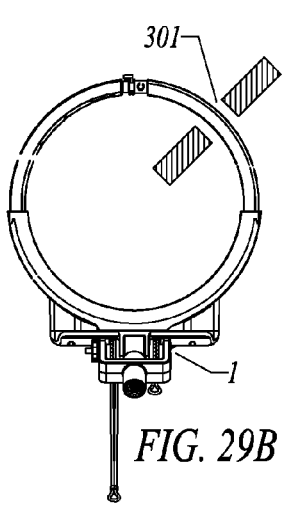

FIG. 29B illustrates an eye 301 at an angle to the operator so that the shuttle passes through the eye prior to converging with the receiver. Alternatively the eye could be on the other side so the receiver passes through the eye prior to converging.

Figure 29C:
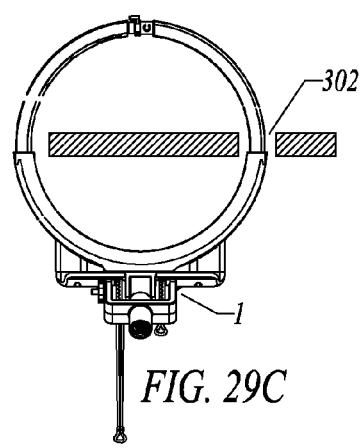

FIG. 29C illustrates the deployment through an eye 302 that is significantly far from the edge of the object. It also illustrates that the eye can be at significantly different angles from the one shown in FIG. 29A.

Figure 29D:
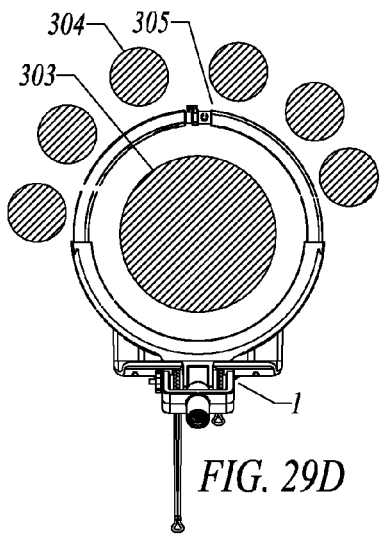

FIG. 29D illustrates deployment and threading through multiple eyes or a passageway 305 formed by an eye member 303 and many eye members 304.

Figure 29E:
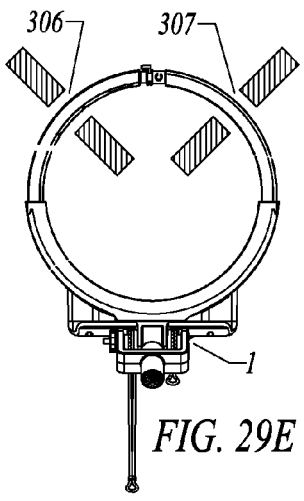

FIG. 29E illustrates that either the shuttle or the receiver or both can pass through an eye. If the arrangement requires it, a rope could be threaded through two eyes, 306 and 307.

Figure 29F:
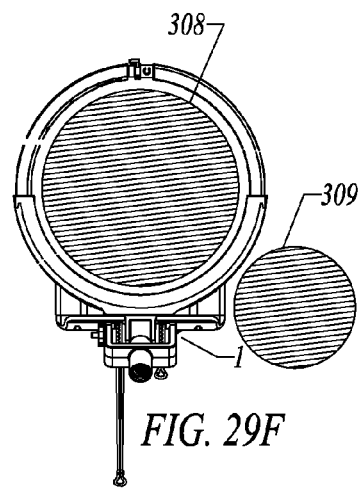

FIG. 29F illustrates the advantage of the narrow body of the tool 1. It allows the arm to be placed through the opening between the eye members 308 and 309 even if they are close together and the eye member to the outside of the arm 309 is closer to the operator.

Figure 29G:
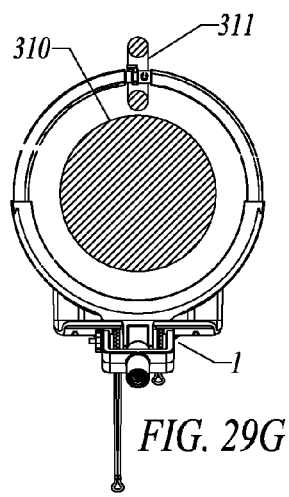

FIG. 29G illustrates that a rope can be threaded both through an eye 311 as well as around an eye 310 in the same action.

Figure 29H:
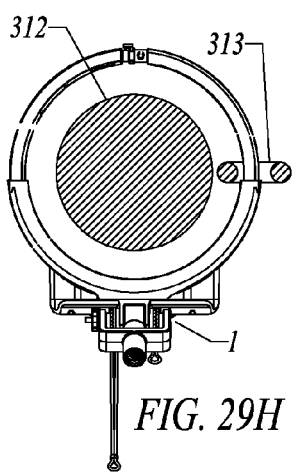

FIG. 29H illustrates the same as 29G with the around eye member 312 the same but with the through eye 313 at a significantly different orientation.

Figure 29I:
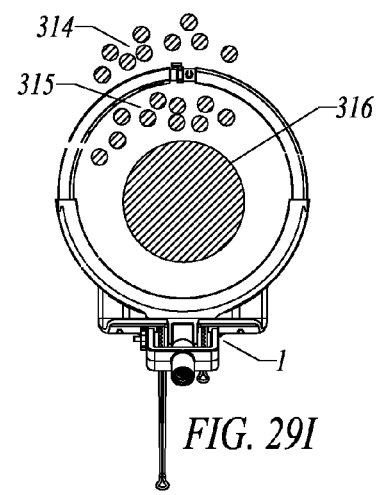

FIG. 29I illustrates that the tool 1 can thread a rope around an eye member 316 but also through a number of other obstructions 314 and 315, both within the arm and without, that may be encountered. This would illustrate how the tool could be used to thread a rope through a bush, shrub, or bushy tree.

FIGS. 30A, 30B, and FIG. 31 are intended to illustrate and make clear the fundamental geometry of the apparatus. The remotely-operated rope-threading tool 1 employs two substantially semicircular arm members that travel in guiding channels which are substantially semicircular and whose paths of motion transcribe a portion of a semicircle. This means that the arms travel in circular paths, a first circle 331 and a second circle 332. These circles define two planes, a first plane 321 and a second plane 322. In order for the ends of the arms to meet in space, these planes must cross at the point of convergence 320. The line formed where the planes cross is the intersection line 340. Therefore, the point of convergence 320 is the point where the two circles 331 and 332 touch each other as well as where these circles touch the intersection line 340.

FIG. 31 further illustrates this geometry by showing the remotely-operated rope-threading tool 1 in side view so the angle between the first plane 321 and the second plane 322, the angle Beta, is clearly shown. This view shows that the point of convergence 320 lies on the intersection of the two planes.

FIG. 32, FIG. 33, and FIGS. 34A and 34B present an alternative configuration of the remotely-operated rope-threading tool 1, which performs the same function but without a shuttle passing from arm end to arm end. In this configuration, the end of the rope 3 is passed from the sending arm 351 directly to the receiving arm 350. The operator secures the end of the rope in the sending barbs 355, which are located on the inside of the sending barbed fingers 353 and point toward the outer end of the sending arm 351. In this embodiment of the invention the sending barbed fingers 353 comprise the means to retain the end of the flexible member. The sending barbed fingers 353 are oriented at approximately ninety degrees to the receiving barbed fingers 352. In this embodiment of the invention the receiving barbed fingers 352 comprise the automatic latching means to capture the end of the flexible member. When the ends of the arms converge, the sending barbed fingers 353 force the end of the rope between the receiving barbed fingers 352, where the rope is caught by the receiving barbs 354, which point away from the outer end of the receiving arm 350. When the arms are deactivated, the receiving arm barbs pull the rope away from the sending arm barbs. FIG. 32 shows the receiving barbs 354 clearly, and FIG. 33 shows the sending barbs 355 clearly. Also shown in these illustrations is the rope relief slot 357 which allows the rope end to line up with the sending barbed fingers 353. FIGS. 34A and 34B are close up views to show the features more clearly.

DESCRIPTION OF OTHER EMBODIMENTS OF THE INVENTION

The preferred embodiment of the remotely-operated rope-threading tool described above is not the only embodiment possible. The current invention is described with pull cord activation. It is envisioned that other methods for activating and deactivating the arms could be employed without deviating from the invention. These methods could include motor (electric, pneumatic, or other) driven methods such as rack and pinion activation, cord winches, and push/pull cable activation among others.

The preferred embodiment of the remotely-operated rope-threading tool described above uses an extension pole for the positioning of the tool. Other methods could be used without deviating from the intent of this invention. These methods could include mounting on manned vehicles such as booms on rescue vehicles, logging vehicles, submarines, and construction vehicles such as backhoes, etc. These methods could include mounting on unmanned vehicles either autonomous or remotely controlled, such as tracked or wheeled robots, stationary robots, or ROVs (Remotely-Operated Underwater Vehicles).

The preferred embodiment of the Control Line Reel for Cable-Actuated Pole-Mounted Implements described above is not the only embodiment possible. Many other clamping methods could be employed to achieve the same results such as band clamps, straps, etc. Also the methods of attaching the reels to the clamps could be many, such as using dovetail slides, other fasteners such as through bolts instead of the screws shown. Alternatively, the clamp halves could be molded directly into the housing of the reels. Clamps could adjust for a greater range of pole diameters or be made for a single diameter. The clamp could include a spring to bias the clamp open to make installation and removal more convenient.

Other embodiments of the invention could include more than one or two reels if required. Embodiments of the invention with two or more reels may have one reel and/or webbing of one color and the other reel(s) and/or webbing(s) of different color. Instead of different colors, the reels and/or webbings could have different patterns or even different tactile textures. Having each reel and/or webbing uniquely identifiable would increase the ability of the operator of the pole-mounted implement to select the correct webbing to pull to actuate the desired function.

DESCRIPTION OF MANNER OF MAKING THE PREFERRED EMBODIMENT OF THE INVENTION

The preferred embodiment of the remotely-operated rope-threading tool and the control line reel for cable-actuated pole-mounted implements would typically be made using common injection molding methods using thermoplastic polymers for the material for the custom-made components. Alternatively, the tool could be made by machining or casting parts from a variety of metals. The threaded fasteners would be standard purchased components made from a corrosion resistant metal, such as stainless steel, or from steel with corrosion resistant coating. Springs for the control line reel would be made from spring steel. The cords and webbing would be made from braided nylon or similar. Common manual or automated methods would be employed to assemble the tool.

The embodiments of the invention in which and exclusive property or privilege is claimed are defined as follows:

1. An apparatus for passing a flexible member through one or more eyes, where the apparatus comprises:
   two substantially semicircular arm members whose guiding channels are substantially semicircular and whose paths of motion transcribe a portion of a semicircle;
   a first channel, a first arm member, and a first motion path which is described by a first circle, and a second channel, a second arm member, and a second motion path which is described by a second circle;
      where the first circle lays on a first plane and the second circle lays on the second plane; the first plane and the second plane are inclined to each other and cross, forming an intersection line which is substantially parallel to the line of action of convergence of the ends of the arm members, the point of convergence falling on the intersection line;
      the first circle and second circle substantially touching each other at the convergence point, and the circles are substantially tangent to the intersection line at the point of convergence;
   a housing to secure the first arm member and the second arm member in the first and second channel in a suitable orientation to each other;
   the outer end of the first arm member with means to retain the end of the flexible member in a secure manner until captured and pulled away by the second arm member;
   the outer end of the second arm member with automatic latching means to capture the end of the flexible member when the outer ends of the arm members converge;
   means to extend the arm members until they converge and the end of the flexible member engages the automatic latching means, means to retract the arm members back into the channels thus pulling the end of the flexible member away from the first arm member with the second arm member with the end of the flexible member captured by the automatic latching means, drawing the flexible member through the eye;
   positioning means to locate the apparatus adjacent the eye; and
   adjusting means to orient the apparatus relative to the positioning means to achieve a suitable approach attitude of the apparatus relative to the eye.

2. An apparatus according to claim 1 where the means to retain the end of the flexible member is separable from the outer end of the first arm member forming a shuttle which includes the means for attaching the end of the flexible member, the means for engaging the automatic latching means on the second arm member, and detent means to securely attach to the first arm member and allow release when pulled upon.

3. An apparatus according to claim 1 where the automatic latching means to capture the end of the flexible member is selectively separable from the outer end of the second arm member forming a receiver which includes the automatic latching means, the means to attach to and be selectively released from the second arm member.

4. An apparatus according to claim 1 where the first and second arm members have the same features on the outer ends of each arm to accept either the shuttle in a manner that allows it to be removed with a pulling action, or the receiver in a manner where it is retained securely and can only be removed with a selected releasing action, and where the location of the manipulation of the selected releasing action; is a feature on the arm enabling the release of the receiver, or is a feature of the receiver enabling the release of itself from the arm.

5. An apparatus according to claim 4 where the separable means to retain the end of the flexible member and the separable automatic latching means to capture the end of the flexible member can be selectively mounted on either arm so that the flexible member can approach the eye from either direction.

6. An apparatus according to claim 1 where the separable means to retain the end of the flexible member and the separable automatic latching means are substantially one piece, joined by an elongated flexible member so as to form a ring when the means to retain the end of the flexible member and the automatic latching means are engaged, and where both the means to retain the end of the flexible member and the automatic latching means will pull free of the arm ends when the arms are retracted and the apparatus is moved away from the target, leaving the ring in location at the target.

7. An apparatus according to claim 6 where the one piece means to retain the end of the flexible member and the automatic latching means, are permanently connected once the means to retain the end of the flexible member is captured in the automatic latching means.

8. An apparatus according to claim 1 where the means for extending and retracting each arm member comprises: a first branch of the activate cord attached substantially at the inner end of the first arm member and a second branch of the activate cord attached substantially at the inner end of the second arm member, to pull the arm members out of the channels to extend them to the point of convergence; and a first branch of the deactivate cord attached substantially near the outer end of the first arm member and a second branch of the deactivate cord attached substantially near the outer end of the second arm member, to pull the arm members back into the channels.

9. An apparatus according to claim 8 where the means for extending and retracting the arm members comprise at least two control cords.

10. An apparatus according to claim 9 where the means for pulling in and paying out the control cords is accomplished by winches or capstans.

11. An apparatus according to claim 1 where the means for extending each arm member comprises: a first branch of the activate cord attached substantially at the inner end of the first arm member and a second branch of the activate cord attached substantially at the inner end of the second arm member, to pull the arm members out of the channels to extend them to the point of convergence; and where the means for retracting each arm member back into the channels is accomplished by biased springs.

12. An apparatus according to claim 1 where the means for extending each arm member comprises substantially a rackand-pinion drive mechanism with the racks on the arms and pinions driving the arms in and out.

13. An apparatus according to claim 1 where the arms have one or more grooves on the convex surface to retain the branches of the control cords.

14. An apparatus according to claim 1 where the arms have suitable anchoring means for the branches of the control cords, and these anchors are at different distances from the plane of the arm so that the control cords running in opposite directions lay adjacent and parallel each other, and parallel the plane of the arm, and parallel the motion path.

15. An apparatus according to claim 1 where the control cords are guided by a suitable arrangement of pulleys to guide the control cords from where the four cord branches of the two control cords leave the two arms tangentially in the plane of the arms to where the control cords exit the apparatus.

16. An apparatus according to claim 1 where the control cords are guided by a suitable arrangement of channels to guide the control cords from where the four cord branches of the two control cords leave the two arms tangentially in the plane of the arms to where the control cords exit the apparatus.

17. An apparatus according to claim 1 where the positioning means to locate the apparatus adjacent the eye comprises a suitable pole member where the apparatus is mounted on the distal end.

18. An apparatus according to claim 17 where the pole member is telescopic.

19. Positioning means according to claim 18, where the positioning means includes reel mechanisms disposed adjacent the operator of the apparatus, and which are spring biased to dispense the control lines during extension of the positioning means and to collect the control lines during retraction of the positioning means.

20. An apparatus according to claim 1 where the positioning means includes reel mechanisms which are spring biased to collect the activate control line and dispense the deactivate control line when the arms are extended, and to collect the deactivate control line and dispense the activate control line when the arms are retracted.

21. An apparatus according to claim 20 where the reel mechanisms comprise: one or more spring biased reels for the collection and dispensing of control lines, reel housings with means to attach to clamping means, clamping means to connect the reel housings to the positioning means, clamping means having gripping means universally adaptable to engage positioning means of various cross sections.

22. An apparatus according to claim 1 where the means to adjust the orientation of the apparatus relative to the positioning means comprises an articulated neck.

23. An apparatus according to claim 1 where the positioning means to locate the apparatus adjacent the eye comprises a remotely-controlled robotic device with means to activate the apparatus.

\* \* \* \* \*